(12) United States Patent
DeKeuster et al.

(10) Patent No.: US 10,862,159 B2
(45) Date of Patent: Dec. 8, 2020

(54) FREE FLOATING BATTERY CELL ASSEMBLY TECHNIQUES FOR LITHIUM ION BATTERY MODULE

(71) Applicant: CPS Technology Holdings LLC, New York, NY (US)

(72) Inventors: Richard M. DeKeuster, Racine, WI (US); Robert J. Mack, Milwaukee, WI (US); Jennifer L. Czarnecki, Franklin, WI (US)

(73) Assignee: CPS Technology Holdings LLC, New York, NY (US)

( * ) Notice: Subject to any disclaimer, the term of this patent is extended or adjusted under 35 U.S.C. 154(b) by 103 days.

(21) Appl. No.: 16/030,969

(22) Filed: Jul. 10, 2018

(65) Prior Publication Data

US 2018/0323468 A1 Nov. 8, 2018

Related U.S. Application Data

(62) Division of application No. 14/818,262, filed on Aug. 4, 2015, now Pat. No. 10,020,534.

(Continued)

(51) Int. Cl.
*H01M 2/10* (2006.01)
*H01M 10/0525* (2010.01)
(Continued)

(52) U.S. Cl.
CPC ......... *H01M 10/0525* (2013.01); *B60L 50/64* (2019.02); *B60L 50/66* (2019.02);
(Continued)

(58) Field of Classification Search
CPC .......... H01M 10/0525; H01M 2/1061; H01M 2/1077; H01M 4/1391; H01M 4/485; H01M 4/505; H01M 4/525; H01M 2220/20
See application file for complete search history.

(56) References Cited

U.S. PATENT DOCUMENTS 5,256,502 A 10/1993 Kump
5,731,103 A 3/1998 Olson et al.
(Continued)

FOREIGN PATENT DOCUMENTS

CN 103633364 3/2014
EP 1156537 11/2001
(Continued)

OTHER PUBLICATIONS

CN 201580057964.2 Office Action dated Jan. 28, 2019.
PCT/US2015/047106 International Search Report and Written Opinion dated Nov. 30, 2015.

*Primary Examiner* — Jane J Rhee
(74) *Attorney, Agent, or Firm* — Boardman & Clark LLP

(57) ABSTRACT

Present embodiments include a lithium ion battery module having a lineup of prismatic lithium ion battery cells positioned within a cell receptacle area of a housing of the lithium ion battery module. The prismatic battery cells of the lineup are spaced apart from one another in a spaced arrangement by fixed protrusions extending from internal surfaces of the housing forming the cell receptacle area, and the fixed protrusions extend inwardly to form a plurality of discontinuous slots across a width of the cell receptacle area.

16 Claims, 14 Drawing Sheets

Related U.S. Application Data

(60) Provisional application No. 62/056,382, filed on Sep. 26, 2014.

(51) Int. Cl.

| | | |
|---|---|---|
| *H01M 4/485* | (2010.01) | |
| *H01M 4/525* | (2010.01) | |
| *H01M 4/505* | (2010.01) | |
| *H01M 4/1391* | (2010.01) | |
| *B60L 50/64* | (2019.01) | |
| *B60L 50/60* | (2019.01) | |

(52) U.S. Cl.
CPC ....... *H01M 2/1061* (2013.01); *H01M 2/1077* (2013.01); *H01M 4/1391* (2013.01); *H01M 4/485* (2013.01); *H01M 4/505* (2013.01); *H01M 4/525* (2013.01); *H01M 2220/20* (2013.01); *Y02E 60/10* (2013.01); *Y02P 70/50* (2015.11); *Y02T 10/70* (2013.01)

(56) References Cited

U.S. PATENT DOCUMENTS

| | | | |
|---|---|---|---|
| 5,756,227 A | 5/1998 | Suzuki et al. | |
| 5,895,728 A | 4/1999 | Walker et al. | |
| 6,189,635 B1 | 2/2001 | Schuler et al. | |
| 7,288,341 B2 | 10/2007 | Amagai et al. | |
| 7,648,538 B2 | 1/2010 | Oogami et al. | |
| 7,862,958 B2 | 1/2011 | Bacon et al. | |
| 7,939,200 B2 | 5/2011 | Ohzuku et al. | |
| 7,965,062 B2 | 6/2011 | Kishi et al. | |
| 7,989,104 B2 | 8/2011 | Jeon et al. | |
| 8,482,262 B2 | 7/2013 | Takami et al. | |
| 8,691,409 B2 | 4/2014 | Shin et al. | |
| 8,748,025 B2 | 6/2014 | Ohta | |
| 8,765,304 B2 | 7/2014 | Isozaki et al. | |
| 2003/0003350 A1 | 1/2003 | Heimer et al. | |
| 2004/0036444 A1 | 2/2004 | Oogami | |
| 2005/0202315 A1 | 9/2005 | Sugeno et al. | |
| 2006/0111625 A1* | 5/2006 | Yamauchi | H01M 10/0431 600/372 |
| 2006/0214631 A1 | 9/2006 | Yoon et al. | |
| 2009/0325060 A1 | 12/2009 | Komaki et al. | |
| 2010/0047682 A1 | 2/2010 | Houchin-Miller et al. | |
| 2010/0273055 A1 | 10/2010 | Jiang et al. | |
| 2011/0076521 A1 | 3/2011 | Shimizu et al. | |
| 2011/0086248 A1 | 4/2011 | Nakura | |
| 2011/0091747 A1 | 4/2011 | Park et al. | |
| 2012/0032638 A1 | 2/2012 | Jung | |
| 2012/0052359 A1 | 3/2012 | Yoshitake et al. | |
| 2012/0064386 A1 | 3/2012 | Oguri et al. | |
| 2012/0270094 A1 | 10/2012 | Hohenthanner et al. | |
| 2013/0071700 A1 | 3/2013 | Hsu et al. | |
| 2013/0122346 A1 | 5/2013 | Jiang et al. | |
| 2013/0183573 A1 | 7/2013 | Yoshioka et al. | |
| 2013/0244066 A1 | 9/2013 | Kang et al. | |
| 2013/0273427 A1* | 10/2013 | Lim | H01M 10/4235 429/220 |
| 2013/0288087 A1 | 10/2013 | Nomura et al. | |
| 2014/0014418 A1 | 1/2014 | Komaki et al. | |
| 2014/0087229 A1 | 3/2014 | Watanabe et al. | |
| 2014/0154530 A1 | 6/2014 | Fujiwara et al. | |
| 2014/0154545 A1 | 6/2014 | Kishii et al. | |
| 2014/0186669 A1 | 7/2014 | Obasih et al. | |
| 2014/0205893 A1 | 7/2014 | You et al. | |
| 2014/0287305 A1 | 9/2014 | Wachsman et al. | |

FOREIGN PATENT DOCUMENTS

| | | |
|---|---|---|
| EP | 1753070 | 2/2007 |
| EP | 1958276 | 6/2007 |
| EP | 1852924 | 7/2007 |
| EP | 2109904 | 7/2008 |
| EP | 2290728 | 3/2011 |
| WO | 2012125115 | 9/2012 |

* cited by examiner

FREE FLOATING BATTERY CELL ASSEMBLY TECHNIQUES FOR LITHIUM ION BATTERY MODULE

CROSS-REFERENCE TO RELATED APPLICATIONS

This application is a divisional of U.S. patent application Ser. No. 14/818,262, filed Aug. 4, 2015, entitled "FREE FLOATING BATTERY CELL ASSEMBLY TECHNIQUES FOR LITHIUM ION BATTERY MODULE," which claims priority to and the benefit of U.S. Provisional Application Ser. No. 62/056,382, filed Sep. 26, 2014, entitled "FREE FLOATING BATTERY CELL ASSEMBLY TECHNIQUES FOR LITHIUM ION BATTERY MODULE," which are hereby incorporated by reference in their entirety for all purposes.

BACKGROUND

The present disclosure relates generally to the field of batteries and battery modules. More specifically, the present disclosure relates to battery cell placement within Lithium-ion (Li-ion) battery modules.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system, such as 48 Volt (V) or 130V systems. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Stop-Start" system similar to the mild hybrids, but the micro-hybrid systems of a mHEV may or may not supply power assist to the internal combustion engine and operates at a voltage below 60V. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of EVs that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12V systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs.

As technology continues to evolve, there is a need to provide improved power sources, particularly battery modules, for such vehicles and other implementations. For example, certain traditional battery modules may include a plurality of battery cells. In such traditional modules, the battery cells may be subject to swelling during use (e.g., charging and discharging), which can affect their operation and, in some situations, cause the cells to move within the battery module. Elaborate clamping mechanisms are traditionally used to compress the battery cells in position, which provides compression to offset swelling and maintains their position within the modules. Accordingly, it is now recognized that traditional battery modules may be subject to further improvement by, for example, reducing or altogether eliminating the need for such clamping mechanisms. Further, it is also recognized that it may be desirable to reduce or mitigate battery cell swelling.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Present embodiments are directed toward a series of battery modules having a plurality of battery cells (which may also be referred to as electrochemical cells herein). For example, in one aspect, the present disclosure relates to a lithium ion battery module having a lineup of prismatic lithium ion battery cells positioned within a cell receptacle area of a housing of the lithium ion battery module. The prismatic battery cells of the lineup are spaced apart from one another in a spaced arrangement by fixed protrusions extending from internal surfaces of the housing forming the cell receptacle area, and the fixed protrusions extend inwardly to form a plurality of discontinuous slots across a width of the cell receptacle area.

In another aspect, the present disclosure also relates to a lithium ion battery module system, including a housing having a base, a top portion opposite the base, a first cell receptacle area comprising a first column of discontinuous slots, the first column extending in a direction from the base to the top portion. The housing also includes a second cell receptacle area oriented parallel to the first cell receptacle area and having a second column of discontinuous slots. The discontinuous slots of the first and second columns are each configured to receive a prismatic battery cell, and are formed by a plurality of protrusions fixed to interior surfaces of the housing.

In yet another aspect, the present disclosure also relates to a lithium ion battery module, including a housing having a base and a top portion opposite the base and having terminals configured to enable electrical connection to the lithium ion battery module. The lithium ion battery module also includes first and second prismatic lithium ion battery cell lineups positioned adjacent and parallel to one another and in the housing. The first and second prismatic battery cell lineups each have a set of aligned prismatic lithium ion battery cells having their respective positive and negative terminals positioned on a single side of the housing. Each lithium ion prismatic battery cell is spaced apart from an immediately adjacent prismatic lithium ion battery cell by an air gap.

DRAWINGS

Figure 16:
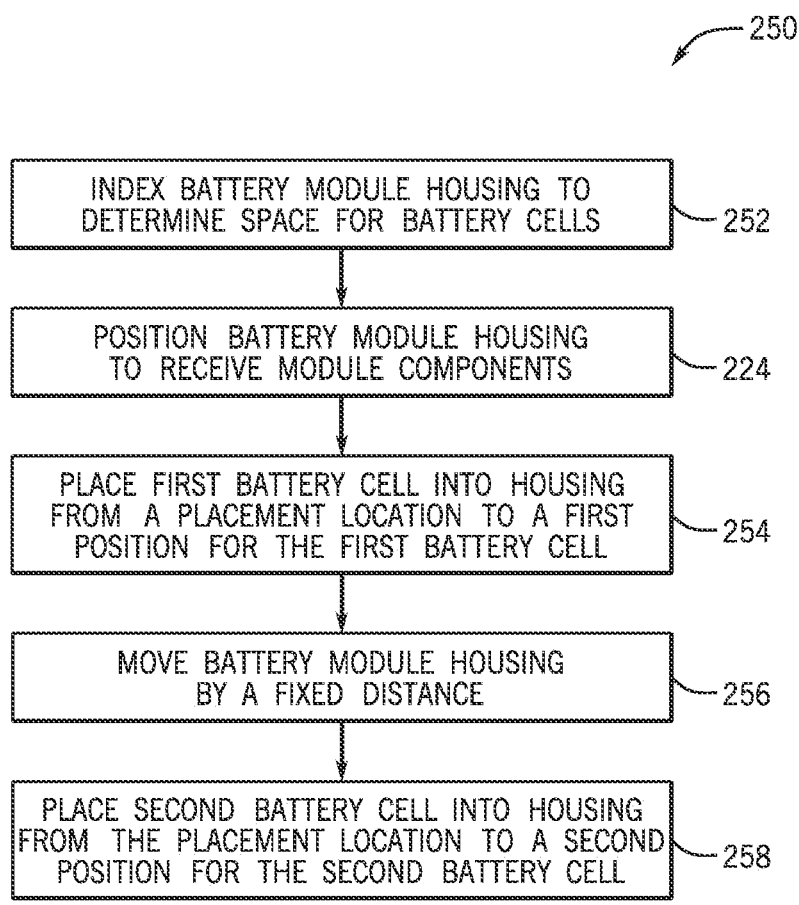
FIG. 16 is a process flow diagram of a method for manufacturing battery modules using the indexing technique performed by the system of FIG. 15, in accordance with an aspect of the present disclosure.
Figure 17:
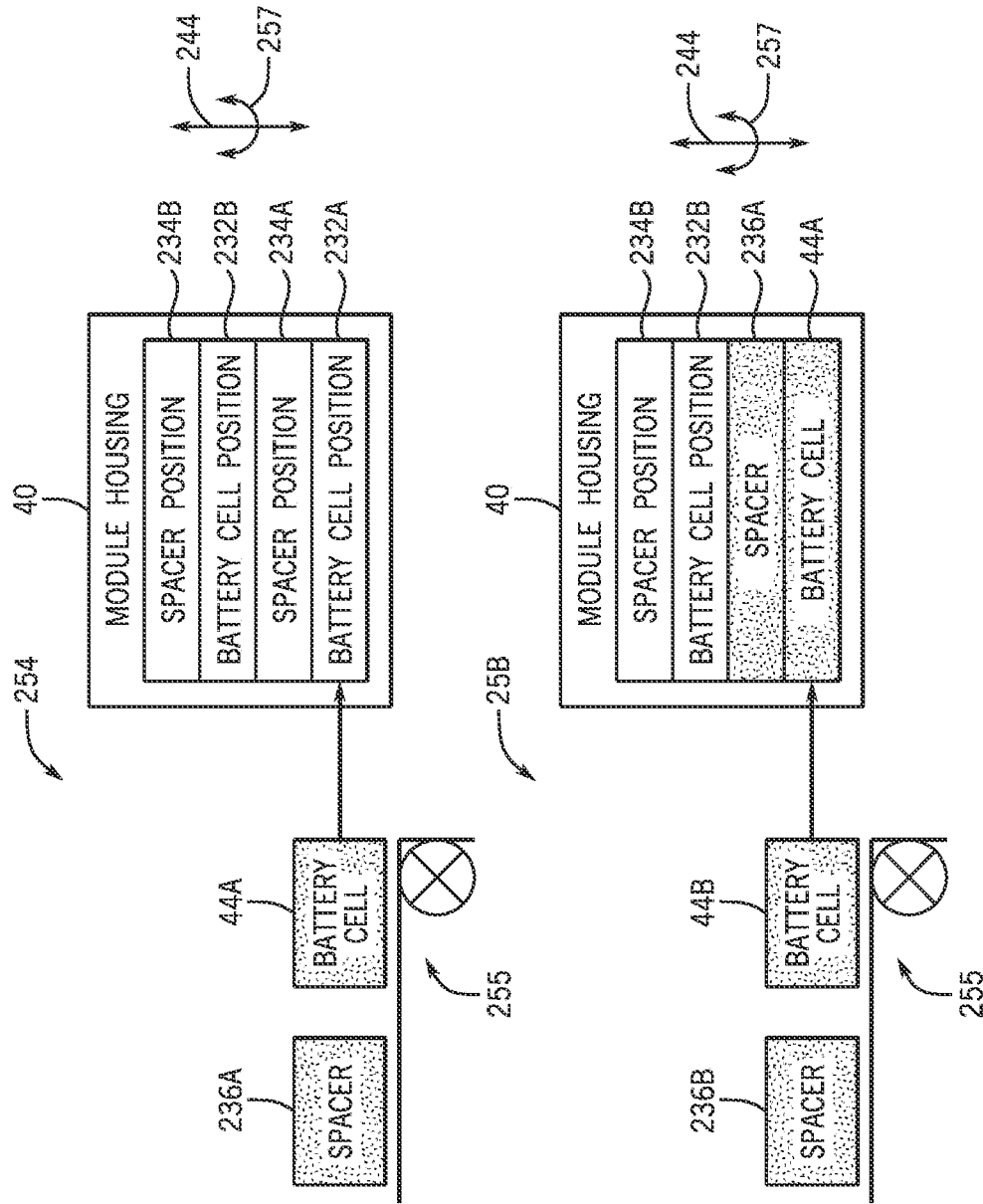
Figure 18:
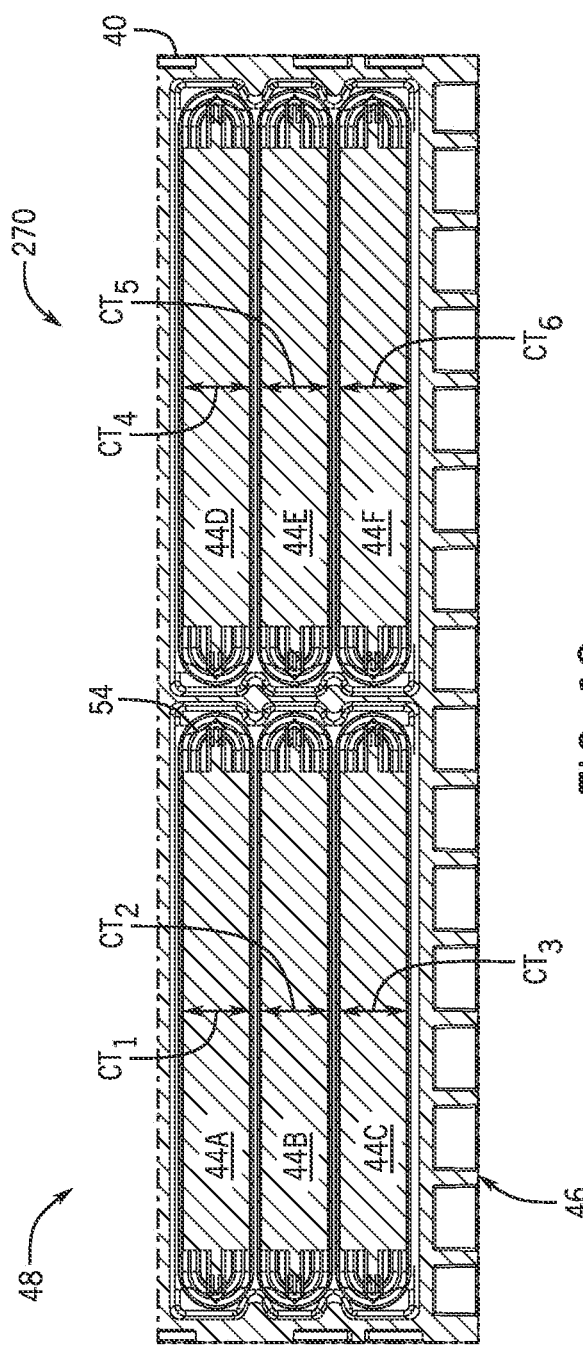

FIG. 17 is a schematic illustration of the indexing technique of FIG. 16, in accordance with an aspect of the present disclosure; and FIG. 18 is a front view of a partially assembled lithium ion battery module having substantially non-swellable battery cells, the battery cells having different states of charge but substantially the same cell thickness, in accordance with an aspect of the present disclosure.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The battery systems described herein may be used to provide power to various types of electric vehicles (xEVs) and other high voltage energy storage/expending applications (e.g., electrical grid power storage systems). Such battery systems may include one or more battery modules, each battery module having a housing and a number of battery cells (e.g., Lithium-ion (Li-ion) battery cells) arranged within the housing to provide particular voltages and/or currents useful to power, for example, one or more components of an xEV. As another example, battery modules in accordance with present embodiments may be incorporated with or provide power to stationary power systems (e.g., non-automotive systems).

Battery cells used in lithium ion battery modules may also be referred to as battery cells, and different types of such battery cells can have different voltages and/or capacities, for example based on the active materials contained within each cell. Generally, lithium ion battery cells will include a cathode (a positive electrode), an anode (a negative electrode), and an electrolyte that provides a source of ions (e.g., lithium ions). In certain configurations, the cathode and anode each include an electrode active material that enables the electrodes to store and transfer ions (e.g., lithium ions) during charging and discharging cycles. Whether the electrode is a cathode or an anode is generally determined by the electrode active material for each and their reference voltages versus Li/Li+. Thus, the electrode active materials will generally be different.

As will be appreciated by those of skill in the art, an electrochemical half-reaction occurs at each of the positive and negative electrodes. For example, the electrochemical half-reaction at the positive electrode may be a reaction in which one or more lithium ions are reversibly (based on an equilibrium) dissociated from the positive electrode active material, thereby also releasing one or more electrons (equal in number to the number of dissociated lithium ions). At the negative electrode, the electrochemical half-reaction that occurs may be a reaction in which one or more lithium ions and one or more electrons (of equal number) are reversibly associated with the negative electrode active material (e.g., carbon).

During discharging of the battery, the equilibria at the electrodes favor dissociation of the lithium ions and electrons from the negative electrode active material and re-association of the electrons and lithium ions with the positive electrode active material. On the other hand, during charging, the reverse is true. The movement of the ions into the electrodes is commonly referred to as intercalation or insertion, and the movement of the ions away from the electrodes is commonly referred to as deintercalation or extraction. Accordingly, during discharging, intercalation occurs at the positive electrode and deintercalation occurs at the negative electrode, and during charging, the reverse is true. Therefore, lithium ion battery cells will generally operate based on lithium ion intercalation and deintercalation at its electrodes.

In this regard, a number of properties of the battery cells may stem from a combination of the physical configuration of the cell (e.g., its shape, size, layout), and its chemical configuration (e.g., electrode active materials, electrolytes, additives). For example, in traditional prismatic battery cells that use graphite as an anode active material, a relatively large degree of size change may occur as a result of charge and discharge cycles, where during charging, lithium becomes intercalated into the active material (graphite), causing the anode to swell, while during discharging, the active material releases the lithium, causing the anode to reduce in size. Such swelling can be problematic in that it reduces the power density of the battery cell, and, as the anode swells, this causes resistance between the anode and cathode to occur, which reduces the efficiency of the cell. In traditional approaches, this swelling is somewhat mitigated by way of placing a relatively large degree of compression force onto the prismatic cells, for example at a position corresponding to their active areas where the electrodes (anode and cathode) are located. However, these clamping mechanisms can be bulky and add considerable weight to a particular lithium ion battery module.

For example, actuatable clamping mechanisms such as a clamp attached to the battery module, a movable plate disposed within the battery module housing that may be actuated (e.g., using a crank, a clamp, an adjustable tie and bolt mechanism) to abut against the battery cells, or an adjustable tie and bolt mechanism used to actuate components (e.g., outer or inner walls) of the battery module housing, may be used to compress the battery cells by a particular amount. This may be done to maintain the energy density and performance of the battery cells within a predetermined range. Prismatic battery cells, for example, are traditionally held in place by such actuatable clamping mechanisms that are a part of or integrated with a battery module housing.

In accordance with the present disclosure, it is now recognized that it may be desirable to mitigate, reduce, or altogether eliminate such swelling without having to rely on such bulky and heavy clamping mechanisms. It is also now recognized that the elimination of such traditional clamping mechanisms may enable other lithium ion battery module features. For example, in certain embodiments of the present disclosure, lithium ion battery modules may be designed to have a particular volume for the battery cells, while other portions of the lithium ion battery modules may be used for other module features, such as control and regulation circuitry (e.g., a battery monitoring system (BMS), a battery control module (BCM)), thermal management features (e.g., fans, cooling paths), and so forth. Indeed, reduced swelling and reliance on clamping mechanisms may also enable battery module sizes and designs that may be particularly suitable for certain applications, such as micro-hybrid applications.

With the foregoing in mind, the present disclosure, in one aspect, is directed toward lithium ion battery modules that include a plurality of battery cells (lithium ion battery cells, also referred to herein as electrochemical cells or cells) in a floating assembly, which is also referred to herein as a floating arrangement. The floating assembly of the present embodiments may include an arrangement where each battery cell is suspended within a housing of the module by a plurality of fixed protrusions (e.g., two or more), and the fixed protrusions hold the cells along their periphery, such as only along a portion of their periphery. In certain embodiments, the battery cells may include specific chemistries that enable the cells to be utilized in the present battery modules with little to no swelling, which in such embodiments enables a gap (e.g., an air gap) to be maintained between the cells without clamping features being placed on the active areas of the cells. For example, during normal operation (e.g., charging/discharging maintained within a certain state of charge (SOC) range), the cells described herein may swell to an extent that is greatly reduced or altogether eliminated compared to other battery cells used in traditional lithium-ion battery modules. Such embodiments are described in further detail below.

It is also now recognized that the reduction in swelling of the prismatic battery cells incorporated into the battery modules described herein may be used to achieve enhanced efficiency in certain manufacturing processes. For example, during a process in which a lithium ion battery module is assembled, the cells may be "picked and placed" during automated or non-automated manufacturing processes. That is, the cells may be picked one by one off of a feed path or out of a bin, without having to determine whether the particular cell is appropriate for inclusion within a particular battery module or cell group. Instead, the battery cell may simply be placed into a module housing.

While the present disclosure includes a number of embodiments that may benefit from the use of certain types of battery cells that have reduced swelling, it should be noted that certain disclosed embodiments may also be applicable to lithium ion battery modules that use a wide variety of cells, including those that swell. In this regard, the description set forth below should not be construed as being limited to certain lithium ion battery cell chemistries, except as otherwise indicated. Indeed, a wide variety of electrode active materials, electrolyte materials, and so forth, may be used in accordance with certain aspects of the present disclosure.

In one aspect, for example, the cathode active material and the anode active material of the electrodes in the lithium-ion battery cells may be selected so as to have reduced swelling compared to other combinations of electrode active materials for the anode and cathode. While the electrode active materials may generally be of any type, configuration, or chemistry, in one embodiment, the cathode active material may include lithium nickel cobalt manganese oxide (NMC, $LiNi_{1/3}Co_{1/3}Mn_{1/3}O_2$), which may be combined (e.g., blended) with other cathode active materials such as lithium cobalt oxide (LCO, $LiCoO_2$), while the anode active material may be lithium titanate (LTO, $Li_4Ti_5O_{12}$). In prismatic battery cells, which are intended to include battery cells having a generally rectangular shape and a hard (e.g., metallic) outer casing, a combination of these active materials may reduce swelling and associated size variability due to charge and discharge cycling. In this regard, such prismatic battery cells may be particularly useful where the cells may be relied upon for reliable charge and discharge cycles to power automotive equipment, home equipment, and so forth.

For example, in certain xEV contexts (among others, such as non-automotive or stationary energy expending applications), a 12 V output from a lithium ion battery module may be desirable to power certain types of components (e.g., similar types of components traditionally powered by a traditional lead acid battery in traditional vehicles), while a 48 V output may be more suitable to power other types of components that may require a higher voltage, such as an air conditioning system. With this in mind, it is now recognized that the present battery module embodiments may be particularly applicable to such types of battery modules. Indeed, the present approaches may enable the production of lithium ion battery modules that may be designed to fit in different locations of an xEV, or in different locations of a home or other setting.

Figure 1:
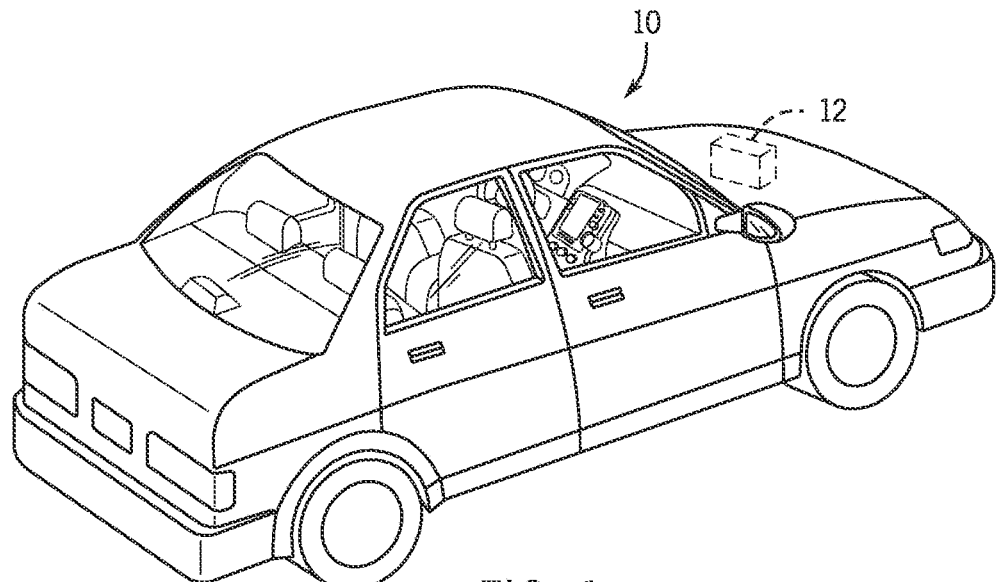
FIG. 1 is a perspective view of an xEV having a battery system configured in accordance with present embodiments to provide power for various components of the xEV, in accordance with an aspect of the present disclosure.

To help illustrate, FIG. 1 is a perspective view of an embodiment of a vehicle 10, which may utilize a regenerative braking system. Although the following discussion is presented in relation to vehicles with regenerative braking systems, the techniques described herein are adaptable to other vehicles that capture/store electrical energy with a battery, which may include electric-powered and gas-powered vehicles, as well as other non-automotive (e.g., stationary) applications.

It is now recognized that it is desirable for a non-traditional battery system 12 (e.g., a lithium ion car battery) to be largely compatible with traditional vehicle designs. In this respect, present embodiments include various types of battery modules for xEVs and systems that include xEVs. Accordingly, the battery system 12 may be placed in a location in the vehicle 10 that would have housed a traditional battery system. For example, as illustrated, the vehicle 10 may include the battery system 12 positioned similarly to a lead-acid battery of a typical combustion-engine vehicle (e.g., under the hood of the vehicle 10). Furthermore, as will be described in more detail below, the battery system 12 may be positioned to facilitate managing temperature of the battery system 12. For example, in some embodiments, positioning a battery system 12 under the hood of the vehicle 10 may enable an air duct to channel airflow over the battery system 12 and cool the battery system 12.

Figure 2:
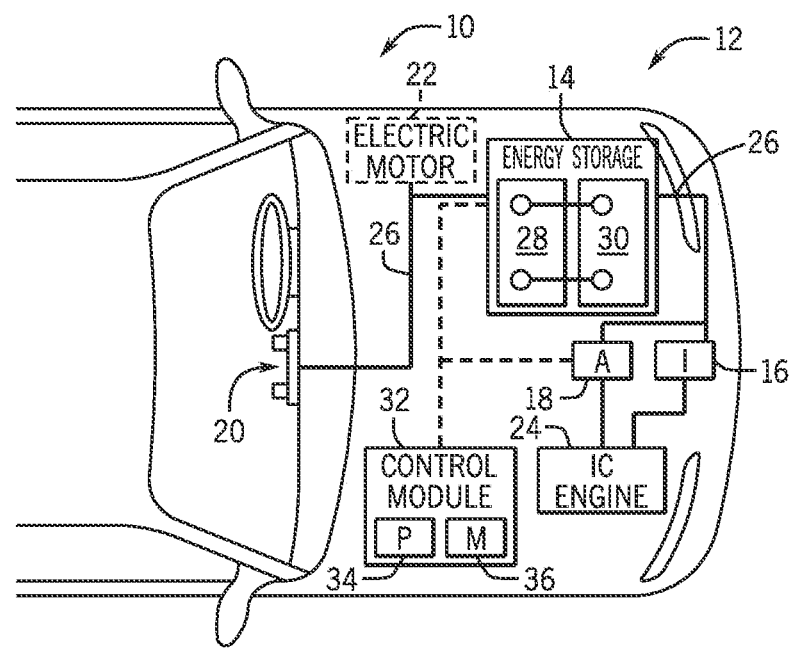
FIG. 2 is a cutaway schematic view of an embodiment of the xEV having a start-stop system that utilizes the battery system of FIG. 1, the battery system having a lithium ion battery module, in accordance with an aspect of the present disclosure.

A more detailed view of the battery system 12 is described in FIG. 2. As depicted, the battery system 12 includes an energy storage component 14 coupled to an ignition system 16, an alternator 18, a vehicle console 20, and optionally to an electric motor 22. Generally, the energy storage component 14 may capture/store electrical energy generated in the vehicle 10 and output electrical energy to power electrical devices in the vehicle 10.

In other words, the battery system 12 may supply power to components of the vehicle's electrical system, which may include radiator cooling fans, climate control systems, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. Illustratively, in the depicted embodiment, the energy storage component 14 supplies power to the vehicle console 20 and the ignition system 16, which may be used to start (e.g., crank) the internal combustion engine 24.

Additionally, the energy storage component 14 may capture electrical energy generated by the alternator 18 and/or the electric motor 22. In some embodiments, the alternator 18 may generate electrical energy while the internal combustion engine 24 is running. More specifically, the alternator 18 may convert the mechanical energy produced by the rotation of the internal combustion engine 24 into electrical energy. Additionally or alternatively, when the vehicle 10 includes an electric motor 22, the electric motor 22 may generate electrical energy by converting mechanical energy produced by the movement of the vehicle 10 (e.g., rotation of the wheels) into electrical energy. Thus, in some embodiments, the energy storage component 14 may capture electrical energy generated by the alternator 18 and/or the electric motor 22 during regenerative braking. As such, the alternator and/or the electric motor 22 are generally referred to herein as a regenerative braking system.

To facilitate capturing and supplying electric energy, the energy storage component 14 may be electrically coupled to the vehicle's electric system via a bus 26. For example, the bus 26 may enable the energy storage component 14 to receive electrical energy generated by the alternator 18 and/or the electric motor 22. Additionally, the bus may enable the energy storage component 14 to output electrical energy to the ignition system 16 and/or the vehicle console 20. Accordingly, when a 12 volt battery system 12 is used, the bus 26 may carry electrical power typically between 8-18 volts.

Additionally, as depicted, the energy storage component 14 may include multiple battery modules. For example, in the depicted embodiment, the energy storage component 14 includes a lithium ion (e.g., a first) battery module 28 and a lead-acid (e.g., a second) battery module 30, which each includes one or more battery cells. In other embodiments, the energy storage component 14 may include any number of battery modules. Additionally, although the lithium ion battery module 28 and lead-acid battery module 30 are depicted adjacent to one another, they may be positioned in different areas around the vehicle. For example, the lead-acid battery module 30 may be positioned in or about the interior of the vehicle 10 while the lithium ion battery module 28 may be positioned under the hood of the vehicle 10.

In some embodiments, the energy storage component 14 may include multiple battery modules to utilize multiple different battery chemistries. For example, when the lithium ion battery module 28 is used, performance of the battery system 12 may be improved since the lithium ion battery chemistry generally has a higher coulombic efficiency and/or a higher power charge acceptance rate (e.g., higher maximum charge current or charge voltage) than the lead-acid battery chemistry. As such, the capture, storage, and/or distribution efficiency of the battery system 12 may be improved.

To facilitate controlling the capturing and storing of electrical energy, the battery system 12 may additionally include a control module 32. More specifically, the control module 32 may control operations of components in the battery system 12, such as relays (e.g., switches) within energy storage component 14, the alternator 18, and/or the electric motor 22. For example, the control module 32 may regulate amount of electrical energy captured/supplied by each battery module 28 or 30 (e.g., to de-rate and re-rate the battery system 12), perform load balancing between the battery modules 28 and 30, determine a state of charge of each battery module 28 or 30, determine temperature of each battery module 28 or 30, control voltage output by the alternator 18 and/or the electric motor 22, and the like.

Accordingly, the control unit 32 may include one or more processors 34 and one or more memory units 36. More specifically, the one or more processor 34 may include one or more application specific integrated circuits (ASICs), one or more field programmable gate arrays (FPGAs), one or more general purpose processors, or any combination thereof. Additionally, the one or more memory 36 may include volatile memory, such as random access memory (RAM), and/or non-volatile memory, such as read-only memory (ROM), optical drives, hard disc drives, or solid-state drives. In some embodiments, the control unit 32 may include portions of a vehicle control unit (VCU) and/or a separate battery control module. Furthermore, as depicted, the lithium ion battery module 28 and the lead-acid battery module 30 are connected in parallel across their terminals. In other words, the lithium ion battery module 28 and the lead-acid module 30 may be coupled in parallel to the vehicle's electrical system via the bus 26.

It should be noted that presently disclosed embodiments may be applicable to any battery module having the same or different configurations and/or orientations described above and in detail below. One of ordinary skill in the art would recognize that the components and examples used to describe battery modules in accordance with the present disclosure should not be construed to limit the present disclosure to those components and examples alone, unless expressly indicated. Rather, the disclosed examples are merely intended to serve as non-limiting examples to facilitate discussion of the present disclosure.

As set forth above, in one aspect of the present approach, the lithium ion battery module 28 may be sized to fit in particular portions of the xEV 10, including under the hood, under a passenger compartment, in a trunk, etc. Further, in another aspect, a plurality of different types of the lithium ion battery module 28 produced in accordance with the present approach may be designed to have a common footprint by designing a volume to be occupied by the battery cells, or the volume available to the battery cells, to have a constant length and width, and differ in the height direction depending on the number of cells in the module. In addition, the design of the volume in the module 28 for the cells may include various other features, such as air gaps, to enable certain types of passive and/or active cooling.

Figure 3:
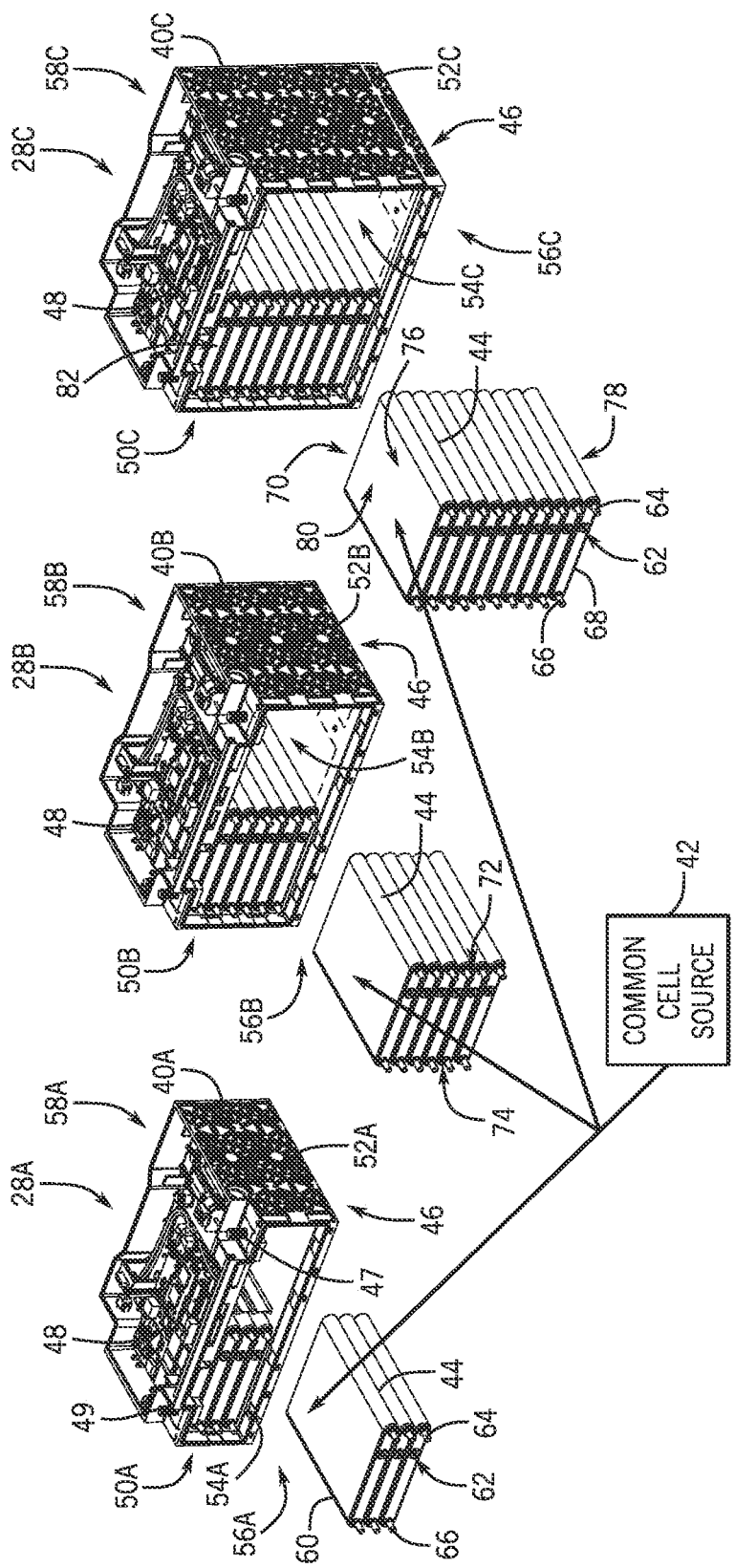
FIG. 3 is a top perspective view of various battery modules illustrating the manner in which a single type of battery cell may be incorporated into different types of lithium ion battery module housings to place a plurality of the battery cells into a floating arrangement, in accordance with an aspect of the present disclosure.

In accordance with one aspect of the present disclosure, different types of the lithium ion battery module 28 may utilize a particular type of prismatic battery cells, as shown in FIG. 3. Specifically, as shown, a first lithium ion battery module 28A, a second lithium ion battery module 28B, and a third lithium ion battery module 28C each have a respective housing 40A-40C, and all use a common source 42 of prismatic battery cells 44. That is, prismatic battery cells 44 conforming to a particular set of manufacturing specifications (e.g., standardized dimensions with standard tolerances, constructions, and chemistries) may be used in any of the illustrated lithium ion battery modules 28. As also shown, each of the lithium ion battery modules 28 includes substantially the same layout of the battery cells 44 in their housings 44, with the difference being in total number only.

For example, in FIG. 3, the first lithium ion battery module 28A may have a first output voltage (e.g., 12 V) and a first capacity (e.g., 10 amp hours (Ah)), and the second lithium ion battery module 28B may have a second output voltage that is the same as the first output voltage while having a second capacity greater than the first capacity (e.g., 20 Ah), depending on the electrical interconnection of the battery cells 44. From a power component standpoint, the second lithium ion battery module 28B differs from the first lithium ion battery module 28A by the number of total battery cells 44 in their respective housings 40. In one embodiment, the first lithium ion battery module 28A may include a first number (e.g., 6) of battery cells electrically coupled in a serial arrangement, while the second lithium ion battery module 28B, which has a larger capacity (e.g., twice the capacity), has a second number (e.g., 12) of the same type of battery cells coupled using a combination of serial and parallel electrical connections. The arrangement of the battery cells within the housings 40, which is described in further detail below, is the primary factor that causes a respective height $H_1$ (shown in FIG. 4) of the lithium ion battery module 28A and a respective height $H_2$ (shown in FIG. 4) of the lithium ion battery module 28B. The third lithium ion battery module 28C has a significantly larger height $H_3$ (shown in FIG. 4) compared to the first and second lithium ion battery modules 28A, 28B. This is due, at least in part, to the additional number of battery cells 44 required for the lithium ion battery module 28 to reach a higher voltage (e.g., 48 V using a third number, such as 20, of the same type of battery cells connected in series).

The housings 40, which may be sized to fit the particular number of battery cells 44 required to reach the desired voltage and capacity, may each be a one-piece housing or a multi-piece housing (e.g., two-piece, three-piece, or more). To facilitate discussion, different sections of the housing 40 (which generally correspond to sections of the overall lithium ion battery module 28) are defined herein as follows: a base 46, which may also be referred to as a bottom portion and generally defines the footprint of the lithium ion battery module 28 when placed in operation (e.g., in the xEV 10). A top portion 48 of the lithium ion battery module 28 is positioned opposite the base 46, and the top portion 48 and the base 46 may be considered, if rested on a flat surface, to be oriented perpendicularly relative to gravity (i.e., Earth gravity), and the top portion 48 generally includes terminals 47, 49 for the battery module 28 (as shown on module 28A). However, it should be noted that these portions of the housing 40 may still be referred to as the base 46 and the top portion 48, even if the battery module 28 were to be set in a different orientation (i.e., the base 46 and the top portion 48 will not always be perpendicular to gravity, such as when placed on another side). The dimensions of the base 46 may be considered to constitute the length (L) and width (W) of the module 28, which is described in further detail below.

The housings 40 also include left sides 50A-50C and right sides 52A-52C, which may be different due to the differences in height of the different lithium ion battery modules 28, which is also described in further detail below. The sides generally extend between the base 46 and the top portion 48. The left sides 50A-50C and right sides 52A-52C are determined, in the illustrated embodiment, with reference to a cell receptacle region 54A-54C for each of the modules 28, which may be considered to correspond to a front end 56A-56C for each lithium ion battery module 28. A back end 58A-58C of each module 28 is positioned opposite the front end 56.

The cell receptacle region 54, as shown, is configured to receive a plurality of battery cells (e.g., prismatic battery cells) in a particular orientation. For instance, in accordance with the present disclosure, the battery cells 44 may each have a prismatic casing 60. The prismatic casings 60 are subject to, and may conform to, a set of manufacturing specifications, including their size in all dimensions, a location of certain features (e.g., vents, terminals), and so forth. To facilitate discussion, the layout of the prismatic battery cells 44 is defined herein as follows: the prismatic casings 60, which are of a generally hard material (e.g., metal), each include a generally rectangular shape, which may include one or more rounded sides. In the illustrated embodiment, the prismatic battery cells 44 include a top casing portion 62 where a set of cell terminals 64, 66 (e.g., positive and negative cell terminals) are located. One or more cell vents 68 may also be located on the top casing portion 62. The set of cell terminals 64, 66 for each of the battery cells 44 enables the cells to be electrically connected to various electrical components, including other cells, to the terminals 49 of the lithium ion battery module 28, and a load to which the lithium ion battery module 28 may be coupled. The cell vents 68 are configured to enable venting of gases under certain conditions.

The prismatic cell casings 60 also include a bottom casing portion 70 positioned opposite the top casing portion 62 and, as shown, the bottom casing portion 70 may be placed into the housing 40 first, such that the cell terminals 64, 66 point outwardly from the cell receptacle region 54 in the same direction. First and second rounded sides 72, 74 extend between the bottom and top casing portions 62, 70 in respective positions corresponding to the cell terminals 64, 66. First and second faces 76, 78, which are generally flat, couple the first and second rounded sides 72, 74 at opposing ends of each cell 44.

To also facilitate discussion, the illustrated configuration of the cells 44 may be configured to be a horizontal stack, where the cells 44 are positioned such that the first and second faces 76, 78 are substantially parallel to the base 46 and the top portion 48, and are substantially perpendicular to gravity when the base 42 is placed on a flat surface. The cells 44 in a particular column 80, 82 (there are two such columns in the illustrated modules 28) may be considered to be vertically spaced such that there is a gap between the respective first face of a first cell and the respective second face of a second cell. Such embodiments are described in further detail below. However, it should be noted that the columns may also be generally referred to as "lineups" of cells in the housing 40, where the lineups may generally denote an aligned array of the battery cells 44, as shown, and is also intended to encompass orientations other than the specific orientation illustrated.

The columnar configuration (e.g., two adjacent columns, such as a lineup and an additional lineup) and the standardized dimensions of the cells 44 may be desirable, for example, to maintain standard dimensions for the base 46 across the different embodiments of the lithium ion battery modules 28A-28C. Indeed, it is now recognized that a combination of the cell chemistry (e.g., NMC/LTO battery cells), cell shape (e.g., prismatic), and cell size may facilitate production of the modules 28 in this way. For example, it is now recognized that NMC/LTO battery cells, or other cells that do not swell by more than a predetermined amount, for example by no more than between 0.1% and 15% (e.g., 0.5% and 5%) in any direction, such as by no more than 5% in any direction, may enable a total cell volume to be defined for each housing 40, and the remaining layout of the lithium ion battery module 28 to be defined relative to this volume. Such an approach may be further appreciated with respect to FIGS. 4-7, which depict various aspects of an approach to generate a plurality of the lithium ion battery modules 28 having a defined footprint (i.e., dimensions for their respective bases 46). While the disclosure set forth below is described in the context of a particular footprint, it is noted that the approach may be suitable for other footprints and other types of cells.

As set forth above, the base 46 of the lithium ion battery module 28 generally defines its footprint. With regard to vehicle integration, this can be an important design concern in that certain sizes for the base 46 may be desired for integration into a particular vehicle due to, for example, spatial constraints. Again, the base 46 may be represented by the dimensions of the portion of the battery module housing 40 that is ultimately mounted to or rests on a surface of the xEV 10 (e.g., closest to the ground/floor).

Figure 4:
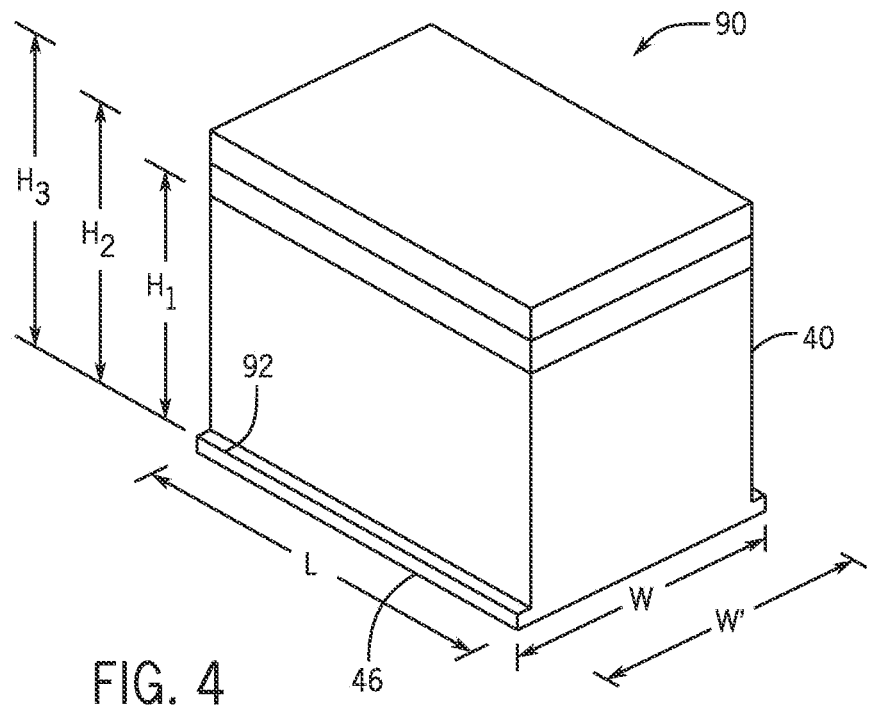
FIG. 4 is a top perspective view of an overlay of lithium ion battery module dimensions corresponding to the lithium ion battery modules of FIG. 3, in accordance with an aspect of the present disclosure.

As shown in FIG. 4, which is a combined illustration 90 of outer dimensions of the modules 28A-28C shown in FIG. 3, all the housings 40 include the base 46, which generally corresponds to a length (L) and a width (W) of each of the lithium ion battery modules 28. Although the lithium ion battery modules 28 are intended to represent advanced battery modules having lithium ion battery cells, the base 46 may correspond to any one of the many group representations (e.g., Battery Council International (BCI) group numbers, Deutsche Industrie Normen (DIN codes), European Norm (EN) codes) established for traditional lead acid batteries (e.g., lead acid battery module 30 in FIG. 2). Each group (e.g., group number) from these established set of standards has a standard length and width for the base of the particular battery corresponding to the particular group designation. The secondary lithium ion battery modules described herein may or may not have dimensions that substantially match or comply with the standard dimension requirements of at least a base of a known lead acid battery standard (e.g., a BCI group, DIN code, or EN code).

As one example, L and W may be sized to have an H5 (where "H5" is a DIN code) base, which is 242 mm in L by 175 mm in W. The H5 base is also commonly referred to as an LN2 base. However, the base 46 of the lithium ion battery modules 28 may have any length and width suitable to substantially match a particular base of a lead acid battery. Further, it should be noted that although standardized for lead acid batteries, it can be difficult to conform to such standards using lithium ion battery cell technologies, especially when considering that lithium ion battery modules, such as those described herein, may be associated with equipment not found in traditional lead acid batteries such as intelligent control features, thermal management features, advanced venting features, and so forth. Using the configuration of the cells 44 set forth above and described in further detail below, such standards may be realized.

It should be noted that the present disclosure is not limited to the bases 46 of the lithium ion battery modules 28 being the same size as a lead acid standard. Rather, the lithium ion battery modules 28 may have any size for their respective bases 46, which in certain embodiments may be the same for the different lithium ion battery modules 28. As a non-limiting example, L may be a value between 150 mm and 450 mm, and W may be a value between 100 mm and 200 mm, where the values match for all the modular lithium ion battery modules 28. Further, as also shown, the modules 28 have a lip 92 on the base 46, which may be a hold down feature configured to enable fastening of the battery module 28 to the xEV 10. In the illustrated embodiment, W corresponds to the dimensions established by the lip 92, while in other embodiments where the lip 92 is not present, the width may be W', which may be shorter.

Again, the respective heights $H_1$, $H_2$, $H_3$, of the battery modules 28A-28C, respectively, may differ based on their power components. In one embodiment and by way of non-limiting example, $H_1$ may be between 130 and 160 mm, such as 150 mm, $H_2$ may be between 160 mm and 180 mm, such as 170 mm, and $H_3$ may be between 160 mm and 200 mm, such as 190 mm. It should be noted that the respective heights of the different modules 28 may also be subject to design constraints. As an example, if the modules 28 are intended to be placed under the hood of the xEV 10, the heights $H_1$-$H_3$ should be tall enough to allow the use of a desired number of battery cells 44, but be short enough to enable the hood of the xEV 10 to close. Similar spatial constraints may be placed on the battery module design depending on, among other things, its intended placement.

Figure 5:
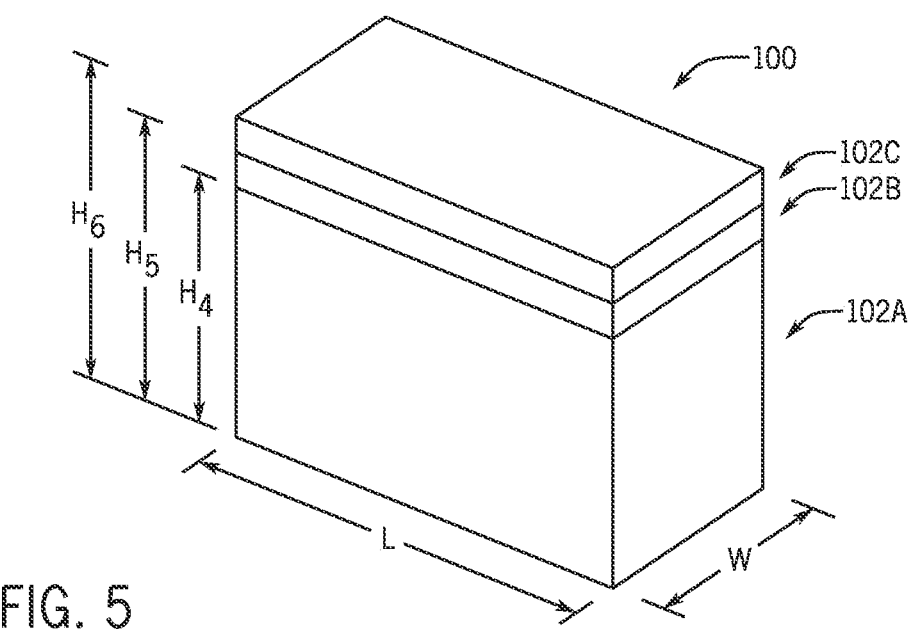
FIG. 5 is a top perspective view of an overlay of available cell volumes of the lithium ion battery modules of FIG. 3, in accordance with an aspect of the present disclosure.

To determine the available space for certain components other than the battery cells 44, it may be desirable to determine an available cell volume for the module 28 within the housing 40, which in turn depends on the desired output of the module 28, the number of cells 44 required to provide the output, and so forth. FIG. 5 depicts an example overlay 100 of respective available cell volumes 102A-102C for the first, second, and third lithium ion battery modules 28A-28C. The illustrated cell volumes 102A-102C may be considered to represent the volume and dimensions within the housings 40A-40C available to be occupied by the battery cells 44 in combination with any retaining, clamping, and spacing features within the housings 40A-40C. It is now recognized that the portion of the respective volumes 102A-102C occupied by the cells 44 and their associated securement features may be reduced or minimized in accordance with certain embodiments described herein, such as when the cells 44 are substantially non-swelling, and/or when the modules 28 do not use hold down or clamping features for the cells 44. Indeed, such embodiments may reduce the occupied portion of the available cell volume 102 compared to embodiments where clamping and hold down features for the cells 44 are utilized.

Again referring to an embodiment where the modules 28 have an H5 base, the dimensions of the available cell volume 102 may be between 230 mm and 240 mm for L, and between 110 mm and 130 mm for W, such as 236 mm and 120 mm, respectively. For the first module 28A, a height $H_4$ of the available volume 102A may be between 140 mm and 150 mm, such as 144 mm. For the second module 28B, the height $H_5$ of the available volume 102B may be between 160 mm and 170 mm, such as 164 mm, and for the third module 28C, the height $H_6$ of the volume 102C may be between 180 mm and 190 mm, such as 184 mm.

Figure 6:
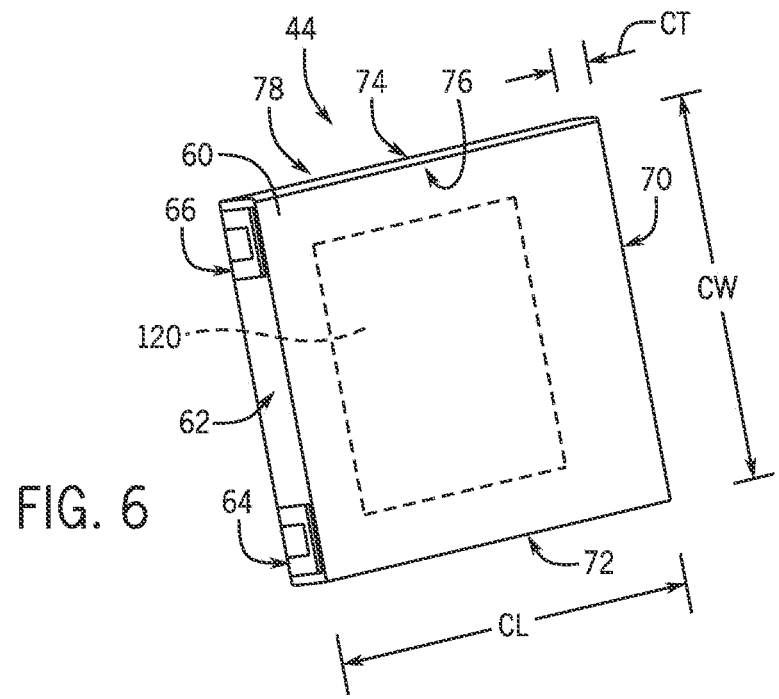
FIG. 6 is a perspective view of a prismatic battery cell that may be incorporated into the battery modules of FIG. 3, in accordance with an aspect of the present disclosure.

As may be appreciated, the amount of the available cell volume 102 that is occupied in a particular lithium ion battery module 28 may depend on the number of the battery cells 44, the shape and dimensions of the battery cells 44, and the manner in which the cells 44 are positioned within the housing 40 of the module 28. Accordingly, dimensions, shapes, and chemistries of the battery cells 44 may be designed to achieve a desired form factor, volume, and output. As noted above and shown in greater detail in FIG. 6, the battery cells 44 described herein generally have a prismatic shape, which generally includes a rectangular shape, and may also include certain rounded sides as shown in FIG. 3. Dimensions of the prismatic battery cell 44, as shown in FIG. 6, include a cell length (CL) along the rounded sides 72, 74, a cell width (CW) along the top and bottom portions 62, 70, and a cell thickness (CT) extending between the first and second faces 76, 78. As one example, the battery module 28 may be designed to have an H5 base with a 12V or a 48V output, and a 10 Ah or 20 Ah capacity, using cells 44 that have a CL of 140 mm with a tolerance of 0.5 mm, a CW of 112 mm, and a CT of 14 mm. However, the cell dimensions may vary, depending on the desired dimensions of the modules 28. The chemistry of the cell, in such embodiments, may include NMC as a cathode active material (e.g., a combination of NMC and $LiCoO_2$ (LCO)), and LTO as an anode active material. Indeed, because the lithium ion battery module 28 may be placed in parallel with a lead acid battery module, it may be desirable to use such electrode active materials, since each lithium ion battery cell will be substantially voltage matched with each lead acid battery cell, which may provide a number of operational benefits including charge balancing, overcharge and overdischarge protection, and so forth.

In a more general sense, the embodiment of the prismatic battery cell 44 shown in FIG. 6 includes the first and second terminals 64, 66, which may include the same or different metals, depending on the anode and cathode active materials. By way of example, the positive electrode active material may include one or more lithium metal oxide (LMO) components. As used herein, lithium metal oxides (LMOs) may refer to any class of materials whose formula includes lithium and oxygen as well as one or more additional metal species (e.g., nickel, cobalt, manganese, aluminum, iron, or another suitable metal). A non-limiting list of example LMOs may include: mixed metal compositions including lithium, nickel, manganese, and cobalt ions such as lithium nickel cobalt manganese oxide (NMC) (e.g., $LiNi_{1/3}Co_{1/3}Mn_{1/3}O_2$), lithium nickel cobalt aluminum oxide (NCA) (e.g., $LiNi_{0.8}Co_{0.15}Al_{0.05}O_2$), lithium cobalt oxide (LCO) (e.g., $LiCoO_2$), and lithium metal oxide spinel (LMO-spinel) (e.g., $LiMn_2O_4$).

Generally, the cathode terminal (e.g., terminal 66) will be an aluminum terminal. However, different anode active materials may utilize different terminal materials. For example, in embodiments where the anode active material includes graphite, the anode terminal (e.g., terminal 64) will generally be copper. On the other hand, in embodiments where the anode active material is lithium titanate, the anode terminal may be aluminum. Indeed, it is now recognized that in embodiments where the battery cells 44 use LTO as the anode active material (e.g., as in an NMC/LTO cell), bimetallic regions in the battery module 28 may be reduced or eliminated. For example, in such embodiments, bus bar connections between anode and cathode cell terminals may use a single conductive material (e.g., aluminum), rather than a mixture of conductive materials (e.g., aluminum and copper) that would otherwise cause unwanted galvanic effects. The illustrated terminals 64, 66 are also shown as being flat. However, in other embodiments, the terminals 64, 66 may be post terminals, as shown in FIG. 3.

The prismatic battery cells 44 may also include an active area 120, which is schematically outlined as a dashed box in FIG. 6. The active area 120 may have any shape and size, and is determined based on a corresponding location in the interior of the cell 44 of a "jelly roll," which is a common term that refers to a rolled assembly of anode and cathode layers and an electrolyte. That is, the active area 120 corresponds to an interior location of the cell 44 where, in some embodiments, swelling can occur. As may be appreciated, swelling of the anode layers due to lithium intercalation may cause the jelly roll to de-laminate, which increases the internal resistance of the cell 44 and reduces its performance. This increase in resistance may also cause additional heating, which can cause the electrolyte to begin to vaporize and potentially decompose. Generally, if a prismatic battery cell swells, it will swell in the active area 120 and will increase in cell thickness (CT). As described in further detail below, in accordance with an embodiment, the active area 120 may be in an uncompressed state (e.g., opposing normal forces are not placed on the active area 120) when placed in the housing 40 and, in a further embodiment, may remain in an uncompressed state during operation of the lithium ion battery module 28. In other embodiments, such as those where swelling does occur (e.g., if graphite is the anode active material), then the swelling may be allowed to occur such that the cells in a column are placed into a compressed state by their swelling.

Figure 7:
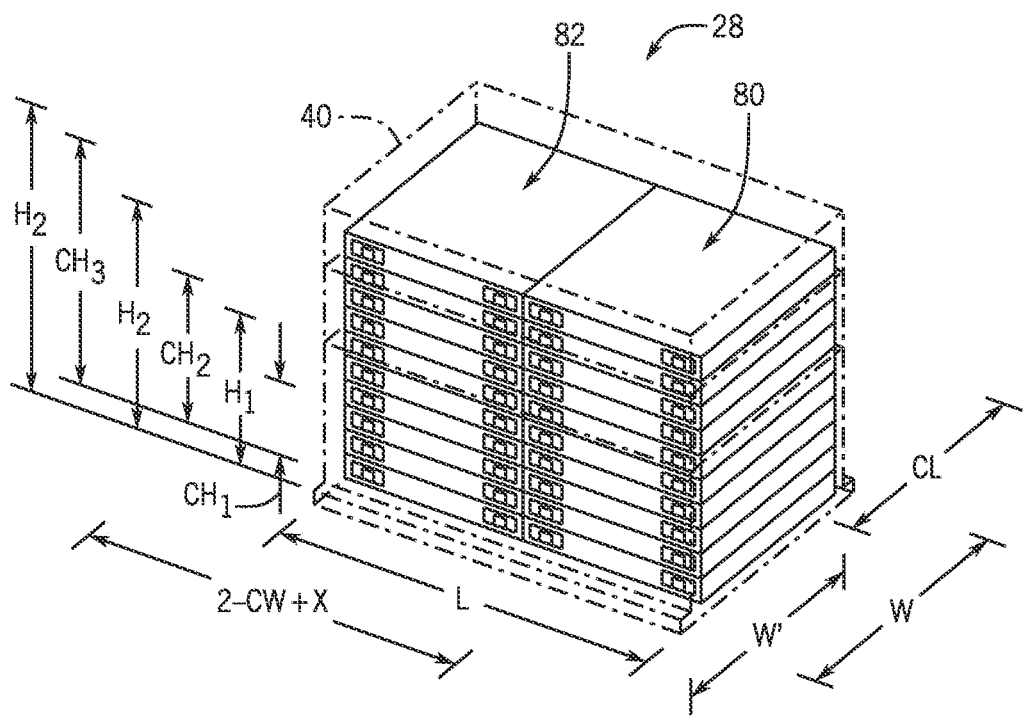
FIG. 7 is a cutaway top perspective view of a plurality of battery cells corresponding to the battery cell of FIG. 6 incorporated into the housing overlay depicted in FIG. 4, in accordance with an aspect of the present disclosure.

To illustrate, FIG. 7 includes a combined cutaway view of the lithium ion battery modules 28A-28C, which includes a first column of prismatic battery cells 80 and a second column of prismatic battery cells 82 disposed adjacent to the first column. The prismatic battery cells 44 in each of the columns may be considered to be in a vertically-spaced arrangement, in that each prismatic battery cell 44 in the column is spaced apart from an immediately adjacent battery cell 44 by a distance. In accordance with an embodiment, the distance may define an air gap that enables the first and second faces 76, 78 to contact a thermal management fluid (e.g., air). Such embodiments are described in further detail below.

As shown in the illustrative example, there are two cell columns in the modules 28, and the number of rows of cells is determined by the total number of cells utilized in the module 28. In other embodiments, there may be only one column of cells, or more than two columns Using the dimensions set forth above for the module 28 and the each battery cell 44, it can be seen that the number of cells 44 used in the module 28, along with their dimensions, is such that the volume occupied by the cells 44 easily fits within the dimensions of the housings 40. As shown with respect to the width of the columns 80, 82, twice the cell width (2*CW) and an additional space (represented as "X") can be fit within the profile, meaning that the cells may not need to be in intimate contact.

Figure 8:
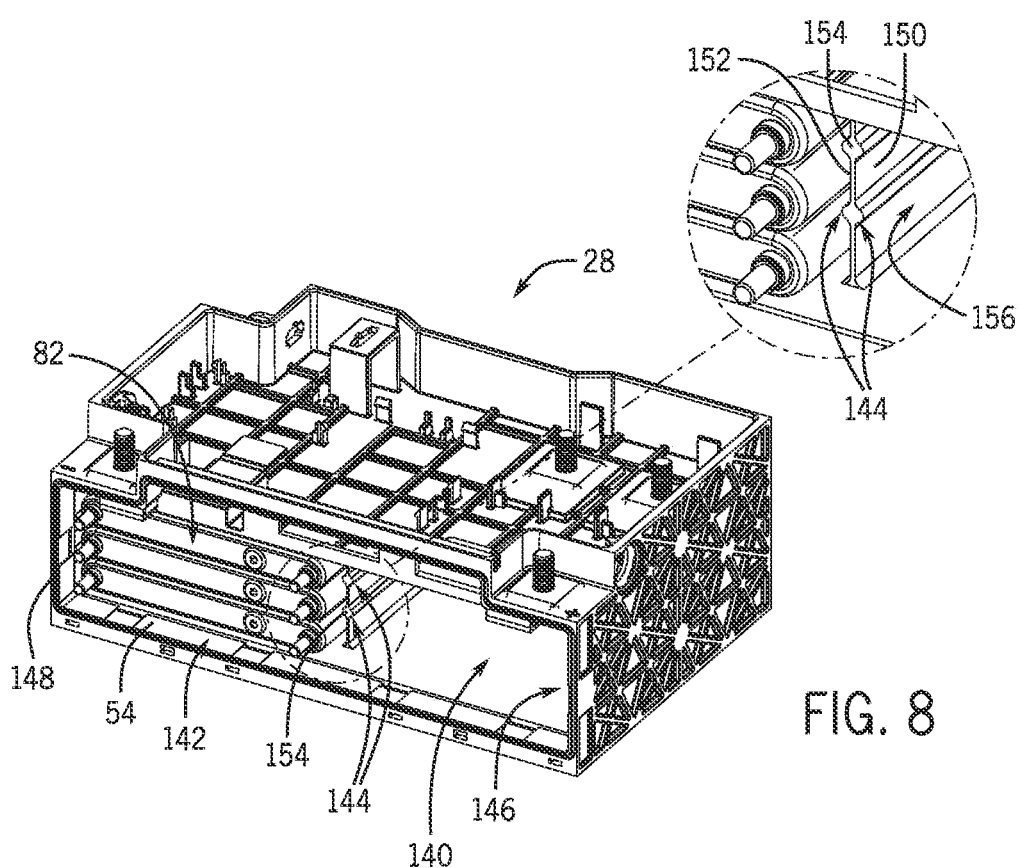
FIG. 8 is a top perspective view of a plurality of battery cells placed within a battery module housing and having an expanded view of fixed protrusions producing a floating cell arrangement, in accordance with an aspect of the present disclosure.

The vertically-spaced arrangement noted above may be further appreciated with reference to FIG. 8, which depicts an embodiment of the battery module 28 in which the cell receptacle region 54 includes first and second cell regions 140, 142 corresponding generally to the first and second cell columns 130, 132. Each of the cell regions 140, 142 includes features configured to place the cell columns in a horizontal orientation in which they are in a vertically-spaced arrangement. Specifically, in the illustrated embodiment, the regions 140, 142 include fixed protrusions 144 that extend inwardly into each region 140, 142 from internal surfaces of the housing 40. In the illustrated embodiment, the internal surfaces include a first sidewall 146 (e.g., internal sidewall) positioned within the cell receptacle region 54, a second sidewall 148 (e.g., internal sidewall) positioned opposite the first sidewall 146, and first and second sides 150, 152 of a cell column divider 154. The cell column divider 154 is generally configured to separate the cell columns 130, 132, and also provides an internal surface to enable discontinuous slots 156 (e.g., partial enclosures) to be formed within the cell regions 140, 142. In an embodiment, the cell column divider 154 is approximately midway between the first and second sidewalls 146, 148.

Thus, the regions 140, 142 each include a column of the discontinuous slots 156, each discontinuous slot 156 being configured to receive a single one of the prismatic battery cells 44 and extending across a width of a respective one of the regions 140, 142. The discontinuous slots 156, and, more particularly, the protrusions 144 of the discontinuous slots 156, are configured to suspend the prismatic battery cells 44 within the housing 40 in a floating arrangement. Again, the floating arrangement may be considered to be one in which the cells 44 are not clamped to one another, not clamped in place to the protrusions 144 or the housing 40, and are not compressed. Further, in certain embodiments, the respective active area 120 of each prismatic battery cell 44 is not in contact with any retaining or other feature, including the fixed protrusions 144. In other embodiments, one or more thermal management features, such as thermal gap pads (not shown) or the like, may be included within the discontinuous slots 156 in combination with a respective prismatic battery cell 44. For example, the thermal gap pads may be positioned in parallel with and against the prismatic battery cells 44.

In some embodiments, the protrusions 144 may suspend the cells 44 within the housing 40 by contacting only a periphery of the cells 44. For example, the fixed protrusions 144 may extend substantially the entire cell length (CL) along the rounded sides 72, 74 of the prismatic battery cells 44, and contact only the sides 72, 74 when the module 28 is fully formed and in operation. That is, in a fully assembled battery module 28, portions other than the sides 72, 74 of the battery cells 44 (at least cells 44 between the extreme upper and lower cells 44) may not be contacted by the housing outside of contact by the protrusions 144.

Figure 9:
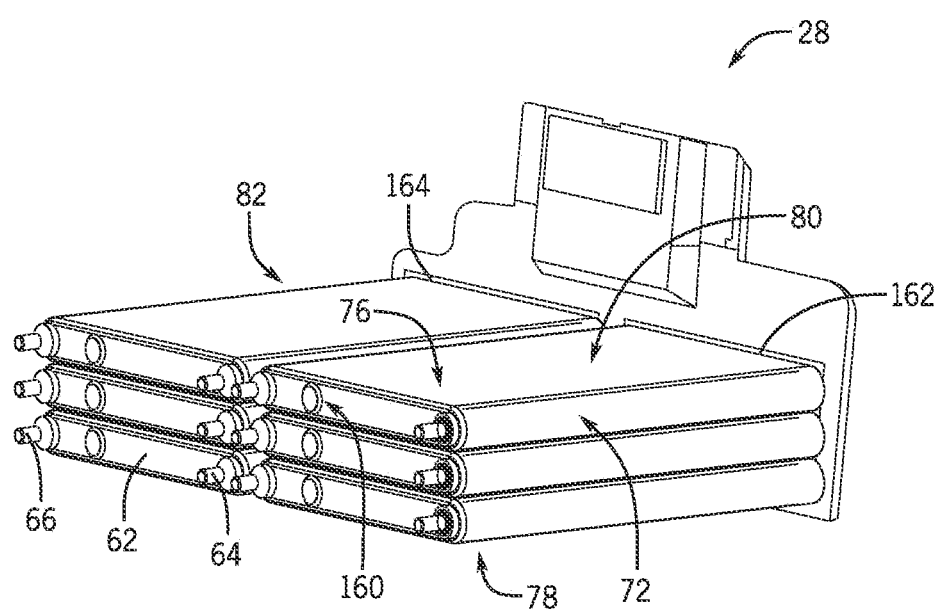
FIG. 9 is a cutaway side perspective view of a lithium ion battery module having a plurality of battery cells in a floating arrangement, with the housing removed to depict the relative positioning of the battery cells when in the floating arrangement of FIG. 8, in accordance with an aspect of the present disclosure.

The floating arrangement of the cells 44 may be further appreciated with reference to FIG. 9, which depicts the housing 40 removed from the cells 44. As illustrated, the cells 44 in each of the columns 80, 82 are vertically spaced from one another (e.g., by the protrusions 144) such that a gap 160 exists between a respective first face 76 of a first cell and a respective second face 78 of a second cell. The gap 106 may be an air gap that enables the active areas 120 of the cells 44 to contact a thermal management fluid (e.g., air). Indeed, in accordance with certain embodiments of the present disclosure, the cells 44 may be NMC/LTO cells (i.e., cells having NMC as a cathode active material and LTO as an anode active material) that swell by no more than 1%, 5%, or 10% in any direction. In this regard, the respective active areas 120 of each cell 44 may not contact one another. Further still, in certain embodiments, the cells 44 may contact thermal gap pads 162, 164 at their respective bottom portions 70 for additional thermal management.

In other embodiments, the cells 44 may be constructed using other chemistries, for example using other anode active materials (e.g., graphite) that cause the cells 44 to swell. In such embodiments, the cells 44 may be configured to swell into the gap 160, where the swelling results in a compressive force being placed on the cells 44 between the cells 44 and the housing 40 (e.g., top and bottom internal surfaces of the housing 40). In certain embodiments, such a configuration may be desirable where contact between charged casings of the cells 44 is desired, for example, to form an electrical connection between casings of immediately adjacent battery cells 44.

Figure 10:
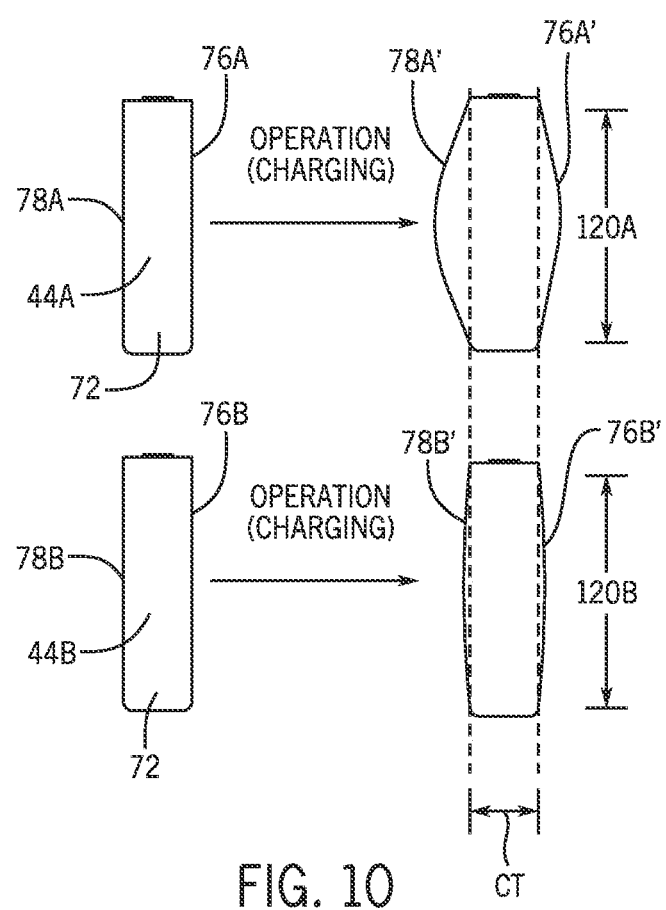
FIG. 10 is a comparative side view of a swellable battery cell and a substantially non-swellable battery cell before and after charging, in accordance with an aspect of the present disclosure.

FIG. 10 is an example of the difference in cell configuration between a first battery cell 44A that exhibits swelling during operation (e.g., an NMC/graphite cell) and a second battery cell 44B that exhibits little to no swelling during operation (e.g., an NMC/LTO cell). Depending on the particular shape of the battery cells 44 (e.g., rectangular versus partially rounded prismatic), the cells 44 may swell in one direction or two directions, or may swell in several directions. For the prismatic battery cells 44, any swelling that occurs will generally be such that the cell thickness (CT) increases.

During operation, and depending on the extent to which the cells 44 are charged and discharged, the first and second battery cells 44A and 44B may swell to some extent. However, during normal operation, the swelling for the second battery cell 44B may be to a lesser extent than the first battery cell 44A, as shown by the cell thickness CT. Specifically, the first battery cell 44A transitions from having respective first and second faces 76A, 78A in a first state (e.g., low SOC) to a second state (e.g., higher SOC) having swelled first and second faces 76A', 78A' in its active area 120A.

In contrast, the second battery cell 44B does not swell to an appreciable extent, or swells to a first extent such that its periphery changes from a first periphery (e.g., from a relatively discharged state on the left) having respective first and second faces 76B, 78B, to a second periphery (e.g., in a charged state on the right) having respective swollen first and second faces 76B', 78B'. The change from the first periphery to the second periphery for the first cell 44A (e.g., an NMC/graphite cell) is generally greater than for the second cell 44B (e.g., an NMC/LTO cell), as shown. The degree of swelling may be represented by the degree of displacement of the outer surface of the cell casing 60 between the configuration of the cell 44 when in a relatively discharged state (e.g., a first state) and the configuration of the cell in a relatively charged state (e.g., a second state). The difference in thickness may be present only as swelling from one side, two sides, or more than two sides. For NMC/LTO cells, the swelling may still be present on one side, two sides, or more than two sides, but will be less than NMC/graphite cells.

It should be noted that the swelling of the prismatic battery cells 44 may also be affected by the degree to which they are discharged and charged, which is generally controlled by the control unit 32 of FIG. 2. For example, the control unit 32 may maintain a state of charge (SOC) of the lithium ion battery module 28 to a range between a first SOC and a second SOC higher than the first SOC. By way of non-limiting example, the first SOC may be between 15% and 25% and the second SOC may be between 40% and 60%. In one embodiment, the first SOC may be approximately 25% and the second SOC may be approximately 50%. By controlling the SOC of the battery cells 44 in this way, in some embodiments utilizing NMC/LTO cells, swelling may be negligible. There may be a number of advantages associated with such reduced, mitigated, or negligible swelling.

For instance, the floating arrangement of the prismatic battery cells may not use clamping or hold down features, which may reduce the volume of the housing 40 occupied by cells and their associated features (e.g., gap pads, spacers), and may also reduce the weight of the lithium ion battery modules 28. Further, in certain embodiments, no opposing normal forces may be placed on the first and second faces 76, 78 from outside the cells 44, meaning that the active areas 120 of the cells 44 may remain in a substantially uncompressed state, which enables heat exchange with a surrounding fluid (e.g., air), and reduces (e.g., mitigates, eliminates) thermal energy transfer between the cells 44. The reduction of thermal transfer may be desirable, for example, to reduce the effect of a thermal runaway of one of the prismatic battery cells 44 on the remaining prismatic battery cells 44.

Figure 11:
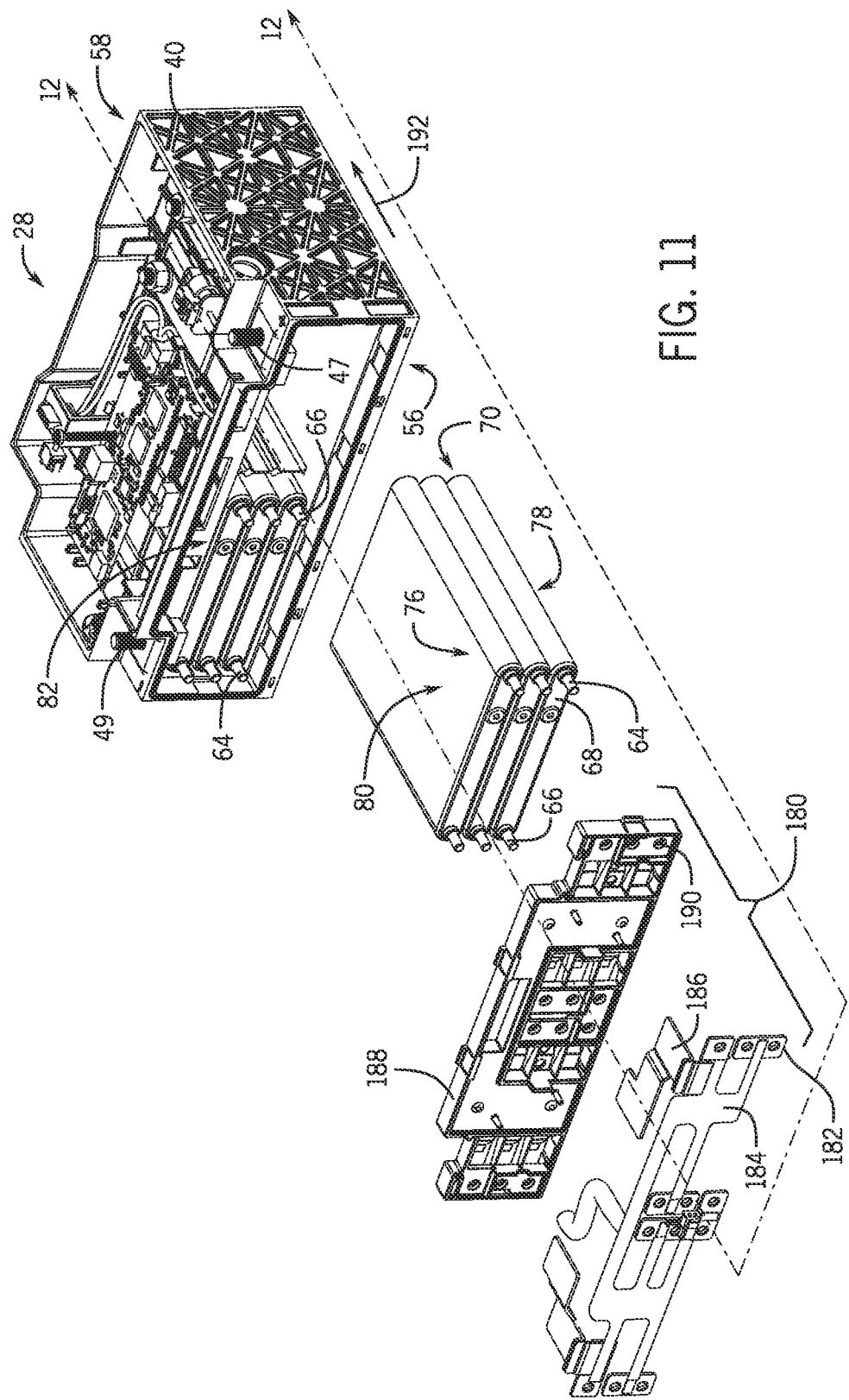
FIG. 11 is an exploded top perspective view of a lithium ion battery module having battery cells that are urged inwardly against a back of a housing by an integrated bus bar and voltage sense subassembly, in accordance with an aspect of the present disclosure.

Other advantages may be associated with the prismatic battery cells 44 having mitigated, reduced, or negligible swelling in accordance with the present disclosure. For example, as illustrated in FIG. 11, the first and second prismatic battery cell columns 80, 82 may be coupled, at the respective first and second terminals of their respective prismatic battery cells 44, to an integrated bus bar and voltage sense subassembly 180. The integrated bus bar and voltage sense subassembly 180 may include bus bars 182 configured to electrically couple the cell terminals 64, 66 to a circuit 184, which places the first and second columns 80, 82 into an electrically connected grouping having a total voltage and capacity corresponding to the voltage rating and capacity rating of the lithium ion battery module 28. In this regard, the integrated bus bar and voltage sense subassembly 180 may include additional bus bars 186 configured to electrically connect the prismatic battery cells 44 (e.g., the electrically connected grouping noted above) to positive and negative terminals 47, 49 (e.g., a first terminal and a second terminal) of the lithium ion battery module 28 to enable the lithium ion battery module 28 to provide an electrical output to an external load (e.g., a load of the xEV 10).

Figure 12:
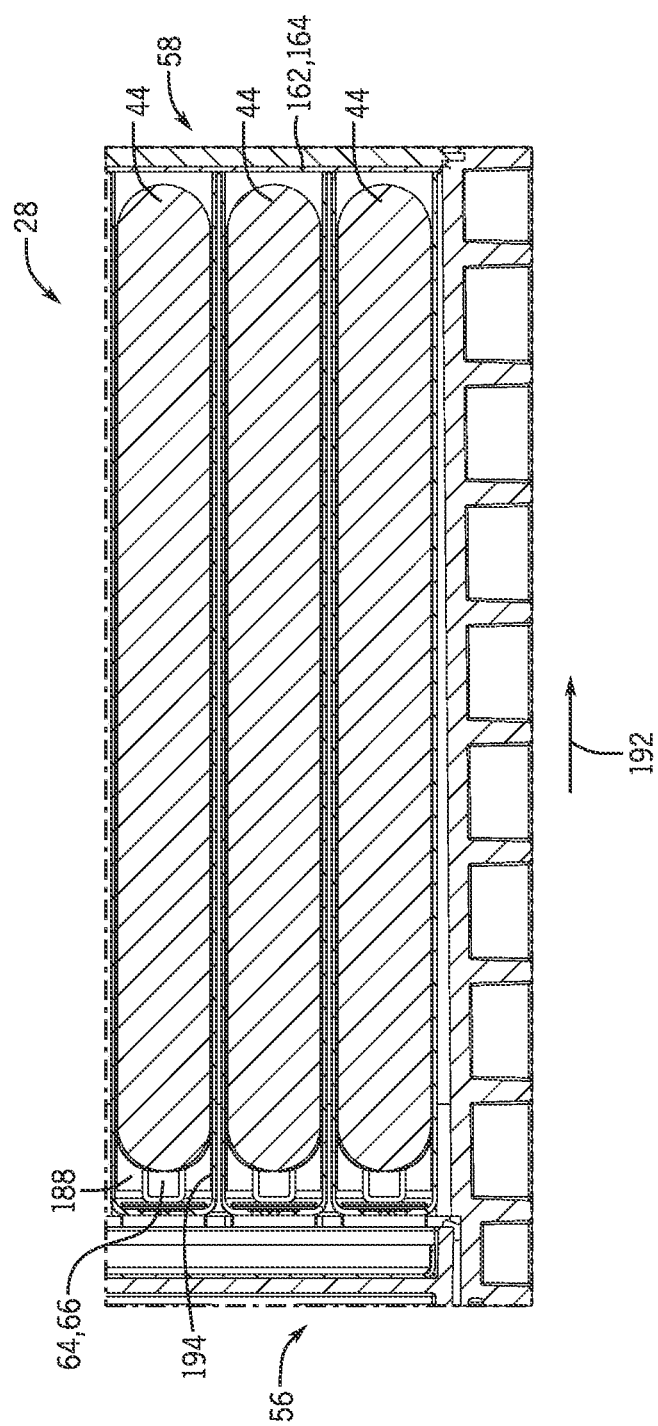
FIG. 12 is a cutaway side view of a column of battery cells in the battery module of FIG. 11 taken along line 12-12, and having one or more spacers positioned between the battery cells, in accordance with an aspect of the present disclosure.

These components of the integrated bus bar and voltage sense subassembly 180 may be integrated onto a carrier 188, which is configured to provide a structural support for the bus bars 182, 186, and the circuit 184. Specifically, the carrier 188 (which may be referred to as an "e-carrier") may include corresponding connection features to hold the bus bars 182, 186, and the circuit 184, as well as openings 190 configured to receive the cell terminals 64, 66. The carrier 188, in one embodiment, may be the only feature of the lithium ion battery module 28 that provides any external compression to the prismatic battery cells 44. Specifically, as depicted in FIG. 11, the integrated bus bar and voltage sense subassembly 180 and the prismatic battery cells 44 may be placed in the housing 40 in a nested arrangement, and the carrier 188 may include features that enable the carrier 188 to be secured to the housing 40 while urging the cells 44 in a rearward direction 192 from the front portion 56 to the back portion 58. While this may impart some compressive force onto the cells 44, this does not compress the cells 44 at their active areas 120, for example such that opposing normal forces are placed onto the faces 76, 78. In this regard, the carrier 188 does not necessarily prevent swelling of the cells 44 when the cell chemistry is subject to swelling (e.g., cells with graphite anode active material). Rather, it provides contact for electrical transmissions between the carrier 188 and cells 44. It also facilitates heat transfer. For example, in FIG. 12, it can be seen that the carrier 188 presses the prismatic battery cells 44 in the rearward direction 192 from the front portion 56 to the back portion 58 and into, for example, the thermal gap pads 162, 164. Thus, the carrier 188 may place (e.g., maintain) a compressive force on the prismatic battery cells 44 along their lengths (CL).

While the present embodiments enable the cells 44 to be placed into the housing 40 in a floating arrangement with an air gap between the faces 76, 78 of the cells (e.g., as shown in FIG. 9), it should be noted that the lithium ion battery module 28 may, in other embodiments, use one or more layers 194 placed between the faces 76, 78. The layers 194 may be, for example, structural support layers (e.g., padding layers to cushion the cells 44), thermal interface layers (e.g., to transfer thermal energy between the cells 44 and other portions of the housing 40, or with each other), and so forth. In certain embodiments, the layers 194 may be used as spacers. As an example, the layers 194 may be used for electrical isolation between the cells 44. As another example, the layers 194 may be used to shim a position (e.g., a vertical position) of the cells 44 within the housing 40. For example, a vertical position of the cells 44 may be shimmed to facilitate alignment of the cell terminals 64, 66 with the carrier 188. Additionally or alternatively, the vertical position of the cells 44 may be shimmed so that each slot (e.g., discontinuous slot) is completely filled (e.g., with one of the cells 44 and one or more of the layers 194).

While certain advantages may be obtained when using the free-floating battery cell assemblies described herein, the present disclosure is not necessarily limited to such configurations. Indeed, the housing 40 may include fully continuous slots, or no slots, in addition or as an alternative to the discontinuous slots 156 described above. Indeed, the description set forth above may also apply to the use of fully continuous slots or no slots in the housing 40, as appropriate. In such embodiments, various practical results may still be realized when using prismatic battery cells 44 that do not swell by more than a particular amount, as described herein.

Figure 13:
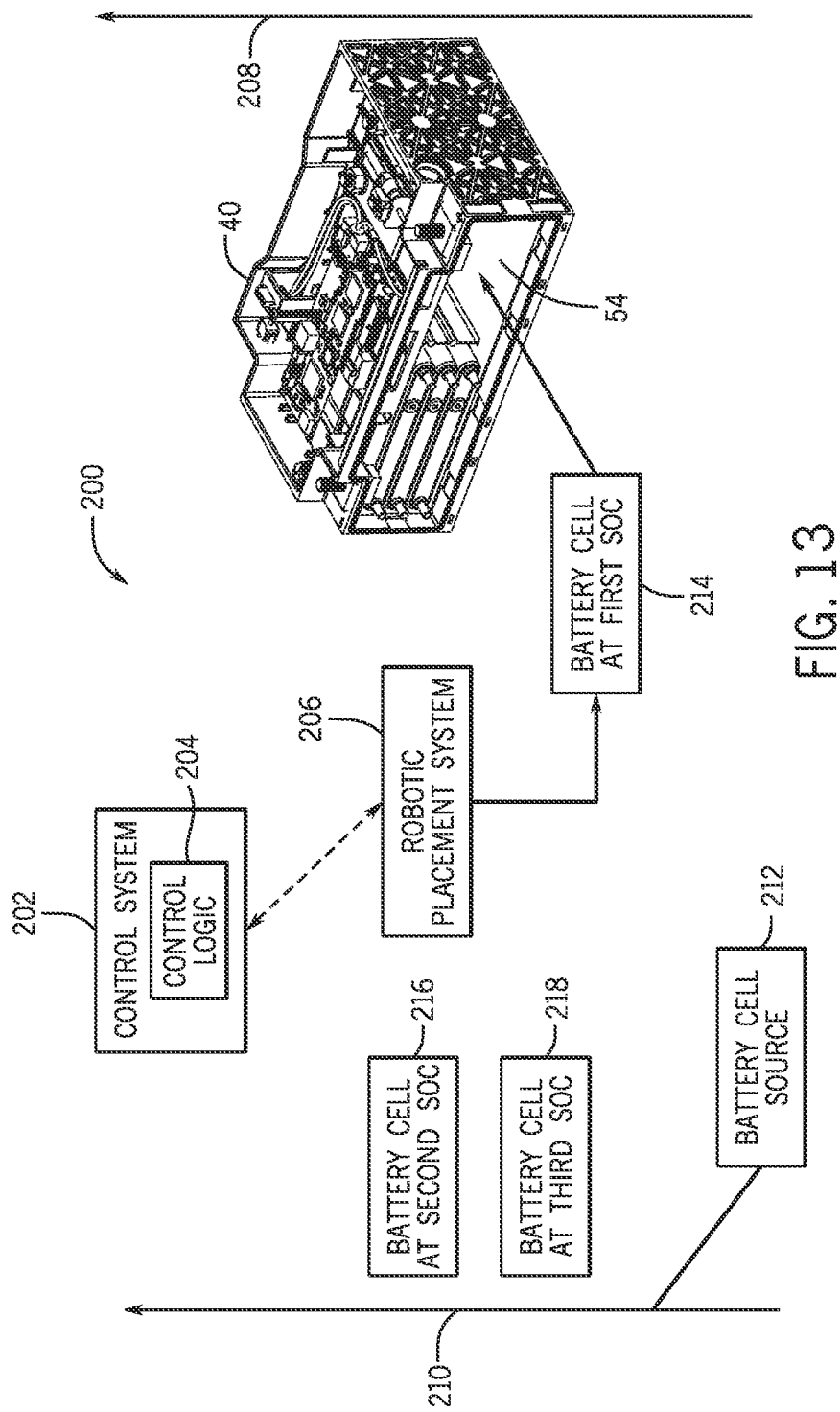
FIG. 13 is a block diagram of a manufacturing system configured to pick and place battery cells into a battery module housing without performing battery cell grading, in accordance with an aspect of the present disclosure.

For instance, certain embodiments of the present disclosure also relate to manufacturing processes and systems that may or may not be automated to produce the battery modules 28 (e.g., to place the prismatic battery cells 44 into the housing 40). While the embodiment illustrated in FIG. 13 is depicted as forming a free floating assembly, it is intended to represent other types of configurations that do not necessarily incorporate a free floating cell arrangement. In accordance with the use of substantially non-swelling NMC/LTO battery cells as described herein (e.g., cells that swell by no more than 20%, such as less than 20%, less than 15%, less than 10%, less than 5% in any direction, or between approximately 10% and 0.1% in any direction), an automated manufacturing system may not need to account for differences in size differences (for example differences in cell thickness) when choosing or otherwise selecting a particular prismatic battery cell 44 to place within the housing 40 of the battery module 28.

In traditional manufacturing systems, a set of prismatic battery cells 44, while being subject to the same manufacturing specifications, may vary within those specifications across one or more tolerance ranges. For example, the cell thickness (CT), cell length (CL), cell width (CW), or any combination thereof, may vary between the prismatic battery cells 44. In traditional battery cells, this variation may result from, for example, differential states of charge, where a first relatively discharged (relatively low SOC) battery cell may have a first size (e.g., relatively small in the size tolerance range) and a second relatively charged battery cell (relatively high SOC) may have a second size different from the first due to lithium intercalation into the anode. In traditional battery modules, a module housing may not be able to fit a set of swollen (e.g., high SOC) cells because they are all on a larger end of a manufacturing size tolerance. On the other hand, a set of relatively low SOC battery cells may not fill the housing to a sufficient extent, which can cause instability in the module. In reality, a set of battery cells may include a mixture of low SOC battery cells and high SOC battery cells, meaning that, for traditional battery cells, the battery cells vary within the manufacturing tolerance by different degrees. To ensure a proper fit, traditional manufacturing systems may determine the size, degree of variation, SOC, or any combination thereof, for each battery cell to determine whether the battery cell is an appropriate fit within a particular housing. Such processes may generally be referred to as "cell grading" processes.

It is now recognized that such grading process may be reduced or eliminated in accordance with certain aspects of the present disclosure, because the NMC/LTO prismatic battery cells 44 do not swell, or only swell by no more than a relatively small percentage (e.g., by no more than 5%). For example, the prismatic battery cells 44 may have a defined dimension (e.g., cell thickness CT), and a defined tolerance range for the CT to allow for some degree of manufacturing variability (e.g., resulting from swelling). For example, a particular standard may allow for a 5% variation in the CT, meaning that the group of prismatic battery cells 44 may have thicknesses ranging from 5% below the defined CT to 5% above the defined CT. Again, the use of 5% is an example.

It is now recognized that not having to account for differences in battery cell size variations resulting from manufacturing variability (e.g., due to swelling) may increase the speed of manufacturing processes, and may also reduce capital costs associated with implementing manufacturing systems. One example of such a manufacturing system 200 (e.g., a pick and place system) is shown schematically in FIG. 13. Specifically, in the illustrated embodiment of the manufacturing system 200, a control system 202 with control logic 204 (e.g., including one or more processors and one or more memory units, one or more ASICs, one or more FPGAs, one or more general purpose processors, or any combination thereof) may be programmed with instructions configured to cause a robotic placement system 206 (e.g., a cell positioning system) to pick (e.g., engage using a capture mechanism) prismatic battery cells and place them in the housing 40 without performing a cell grading process (e.g., without determining a size variability within the manufacturing tolerance of standardized dimensions for NMC/LTO prismatic battery cells). In doing so, the capture mechanism may engage the prismatic battery cell 44 and remove it from an assembled group of the battery cells 44, and this may be done without a cell grading process. In other words, the control system 202 may have control logic 204 that does not determine a size of the prismatic battery cells 44 when engaged with a clamping mechanism (e.g., of the robotic placement system 206). Such cell grading processes may be avoided because it may be assumed that the substantially non-swellable battery cells 44 all have substantially the same size.

The manufacturing system 200 may include an assembly path 208 configured to convey module housings 40, and to position the housings 40 in a location of the system 200 where the robotic placement system 206 inserts the prismatic battery cells 44 into their respective cell receptacle areas 54. The assembly path 208 may include various features configured to move all or a portion of a plurality of battery module housings 40 along a path where the housings 40 are operated upon to incorporate additional components. For example, the assembly path 208 may include various motors, conveyors, sensors, and the like. The sensors may, for example, be used by the control system 202 to determine when the housings 40 are appropriately positioned relative to the robotic placement system 206 so that the control system 202 may instruct the robotic placement system 206 to begin picking and placing the prismatic battery cells 44 into the housing 40.

The manufacturing system 200 also includes a cell feed path 210, which conveys prismatic battery cells 44 from a battery cell source 212 to a location proximate the robotic placement system 206. The battery cell source 212 may represent, for example, a collection (group) of prismatic battery cells all conforming to a set of manufacturing specifications. That is, each prismatic battery cell 44 may have dimensions within manufacturing tolerances of prismatic battery cell dimensions. In accordance with the present disclosure, the cells all conform to the set of manufacturing specifications by having the same cell chemistry (e.g., the same anode and cathode chemistry, size, shape, and so forth, the same electrolyte and additives), and the same defined dimensions for manufacture (i.e., the same set of standardized dimensions), where the actual dimensions of the conforming cells are within a manufacturing tolerance of the defined dimensions.

As an illustrative example, referring to the prismatic battery cell 44 illustrated in FIG. 6, the cell 44 may have a defined value of, for example, 14 mm for the cell thickness CT, and the tolerance of the thickness may be, for example, 0.50 mm, to account for manufacturing variability (e.g., due to different SOCs and associated swelling). Thus, the battery cell source 212 may have a collection of the prismatic battery cells 44 manufactured using the same specifications as the prismatic battery cell in FIG. 6, and having thicknesses varying from 13.5 mm to 14.5 mm. The cell width CW and cell length CL may also have a defined manufacturing value, and a defined tolerance associated with the defined manufacturing value. In this regard, CL, CW, and CT all have defined manufacturing values and associated tolerances. The associated tolerances may range, for example, from 0.5% to 5% of the defined manufacturing value, meaning that the value of the manufactured battery cells 44 may range from between 0.5% and 5% below the defined manufacturing value to between 0.5% and 5% above the defined manufacturing value. By way of example, the tolerances may be approximately 0.5%, 1%, 2%, 3%, 4%, or 5% of the manufacturing value. The tolerance range may depend on the expected degree of size variation resulting from the small amounts of swelling in the NMC/LTO cells. In this regard, such embodiments of the battery cells 44 may be considered to have tolerances that are much tighter than traditional groups of battery cells and, accordingly, may be considered to have substantially matching sizes (e.g., CT, CW, and CL may all be within 5% of a design value).

Returning now to the manufacturing system 200 of FIG. 13, the robotic placement system 206 is shown as placing a first prismatic battery cell 214 into the cell receptacle region 54. The first prismatic battery cell 214 may have actual dimensions (CL, CW, CT) having a first SOC and associated degree of variability within the standardized dimensions.

The robotic placement system 206 may also, upon instruction from the control system 202, pick a second prismatic battery cell 216 and place it in the housing 40 without the control system 202 performing a determination as to the degree of variability of the second prismatic battery cell 216 within the standardized dimensions. Similarly, the control system 202 may cause the robotic placement system 206 to pick a third prismatic battery cell 218 and place it in the housing 40 without the control system 202 performing a determination as to the degree of variability of the third prismatic battery cell 218 within the standardized dimensions. Although the second prismatic battery cell 216 may have a second SOC and associated degree of variability within the standardized dimensions and the third prismatic battery cell 218 may have a third SOC and associated degree of variability within the standardized dimensions, because the prismatic battery cells are NMC/LTO cells, they may not swell to an appreciable extent during operation and, accordingly, are assumed to be appropriately sized for the module 40.

Figure 14:
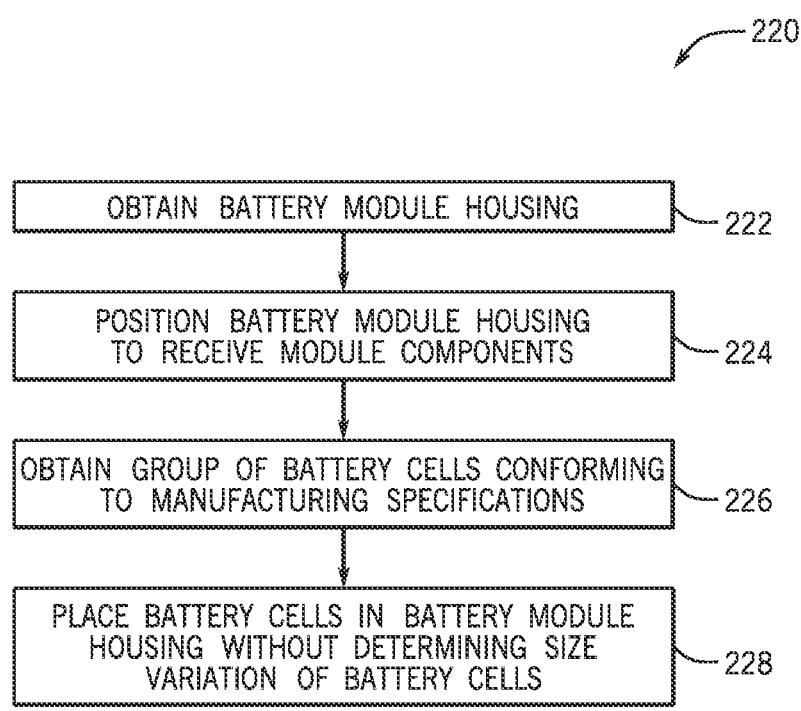
FIG. 14 is a process flow diagram of a method for manufacturing battery modules using the pick and place technique performed by the system of FIG. 13, in accordance with an aspect of the present disclosure.

An embodiment of a method 220 of producing lithium ion battery modules using the system 200 is depicted as a process flow diagram in FIG. 14. As illustrated, the method 220 may include obtaining (block 222) the battery module housing 40. For example, obtaining the battery module housing 40 may include forming (e.g., molding) the battery module housing 40 as a one-piece or as a multi-piece structure. The housing 40 may have any configuration, as noted above, such as a "shoe box" structure that is generally hollow or includes slots or partial slots for prismatic battery cells. As one example, forming the battery module housing may include molding the battery module housing to have first and second columns of the discontinuous slots 156, as generally shown in FIG. 13.

The discontinuous slots may be formed in the molding process by, for example, molding fixed protrusions into an interior of the housing 40. In other embodiments, obtaining the battery module housing may simply correspond to purchasing the housing. In still further embodiments, the battery module housing may be formed by a process other than molding, such as machining. Further still, the housing may be produced by a combination of molding and machining.

The method 220 may also include positioning (block 224) the battery module housing 40 to receive module components (e.g., in an orientation and position where a positioning system inserts components into the housing 40), including the prismatic electrochemical cells 44. For example, as shown in FIG. 13, the assembly path 208 may position the housing 40 proximate the robotic positioning system 206.

The method 220 also includes obtaining (block 226) a group of battery cells that all conform to a set of manufacturing specifications, including a set of standardized dimensions. Again, in accordance with the present disclosure, the battery cells may be NMC/LTO cells that do not swell by more than 5% in any direction. As noted above, it is now recognized that the substantial non-swellable nature of the NMC/LTO cells means that regardless of their respective states of charge, the battery cells are each suitable to be positioned in the housing 40. Accordingly, the method 220 includes placing (block 228) the battery cells in the housing 40 (e.g., in slots, partial slots, discontinuous slots), without determining a size variation of the battery cells. Again, the elimination of this manufacturing step may speed manufacturing and reduce costs. Accordingly, the NMC/LTO prismatic battery cells may simply be picked from, for example, the cell feed path 210 and placed in the housing 40.

Figure 15:
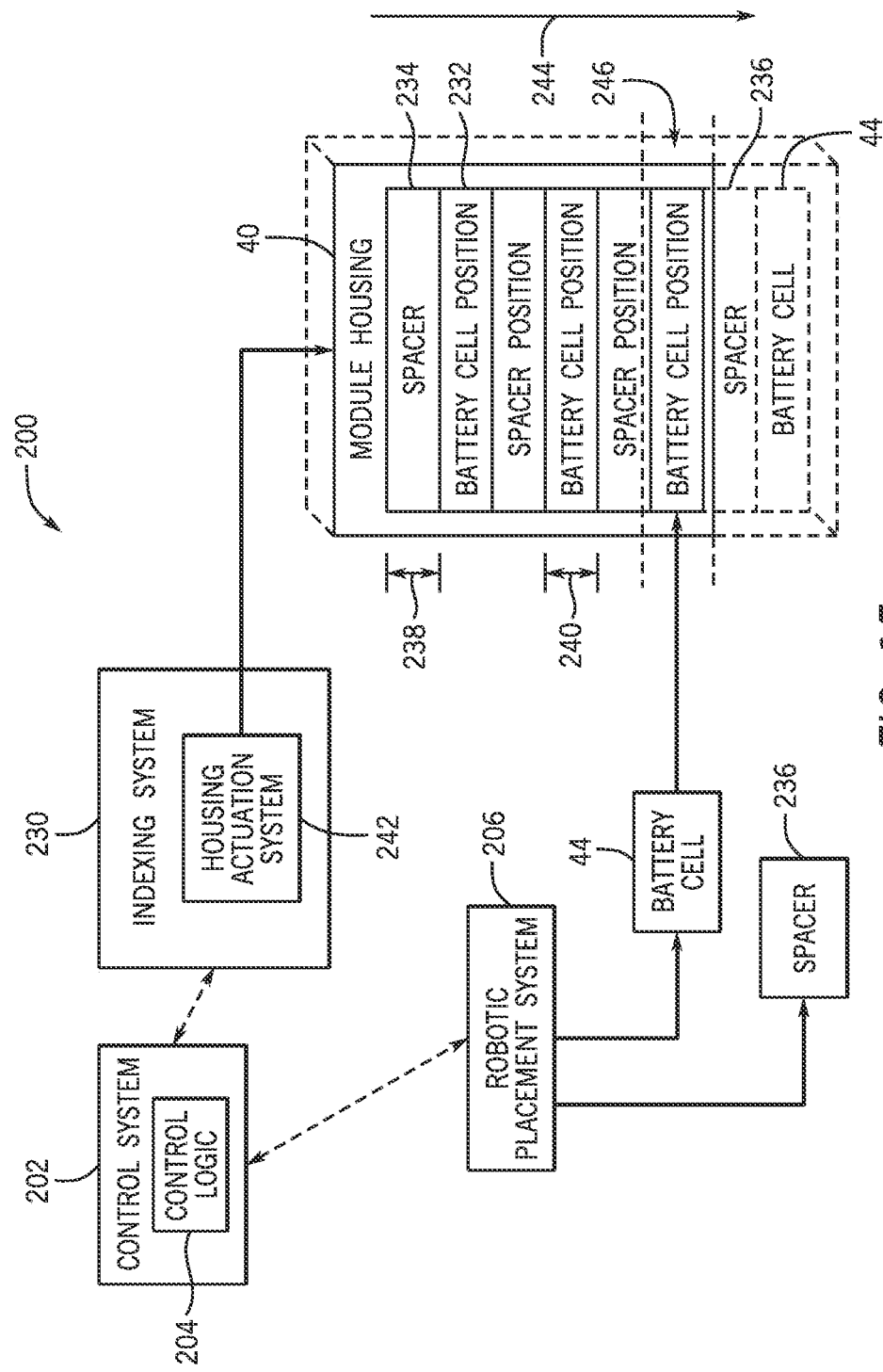
FIG. 15 is a block diagram of a manufacturing system configured to index a battery module housing, and to place battery cells and other components into the housing in accordance with the indexing, in accordance with an aspect of the present disclosure.

FIG. 15 depicts another embodiment of the manufacturing system 200, which may be used in combination with elements of the system 200 of FIG. 13 (e.g., control logic configured to cause pick and place battery cell placement), or instead of such elements. Specifically, the manufacturing system 200 includes the same system components as shown in FIG. 13, and also includes an indexing system 230. The indexing system 230 may include, among other things, sensors, computing equipment (e.g., memory circuitry and processing circuitry), and so forth, that enable the indexing system 230, either alone or in combination with the control system 202, to index the battery module housing 40. In indexing the battery module housing 40, the indexing system 230 may, for example, index a plurality of battery cell positions 232 of the housing 40, which correspond to positions where battery cells 44 are placed within the housing 40. The indexing system 230 may also, in some embodiments, index spacer positions 234 for spacers 236 (e.g., layers 194) that may be located between the battery cells 44. The spacers 236 may be used, for example, for electrical insulation and thermal conductance, and may include padding layers, thermal gap pads, and the like. The spacers 236 may, additionally or alternatively, be used for compression of the battery cells 44 within the housing 44. The battery cell positions 232 and the spacer positions 234 may be indexed in combination, or separately. Further, it should be noted that each illustrated box for the battery cell positions 232 and the spacer positions 234 may correspond to slots in the housing 40 configured to separate the battery cells 44 from one another or, in other embodiments, may simply correspond to a position but not a physical feature of the housing 40.

As one example, the indexing system 230 may index the spacer positions 234 to determine a distance 238 corresponding to each of the spacer positions 234, and may also index the battery positions 232 to determine a distance 240 corresponding to each of the battery positions 232. The indexing system 230 may perform such indexing to determine an extent to displace the battery module housing 40 during assembly of the module 28. These indexed distances may be stored by, for example, the control system 202 (e.g., in non-transitory machine-readable memory), and used to cause a housing actuation system 242 of the indexing system 230 to move the housing 40 by the indexed distances. By way of example, the housing actuation system 242 may include actuators such as one or more servomechanisms to move the housing 40 (and components installed in the housing 40) by the indexed distance corresponding to the spacer position 234, by the indexed distance corresponding to the battery cell position 232, or by a combination of the two indexed distances, or any combination of the indexed distances. For example, the housing actuation system 242 may actuate the module housing 40 in a direction 244 by an amount corresponding to the indexed distance, and one of the battery cell positions 232 and/or one of the spacer positions 234 may be positioned in an insertion location 246 of the indexing system. The insertion location 246 may be a location where the robotic placement system 206 repeatedly inserts one of the battery cells 44, one of the spacers 236, or a combination thereof, into the housing 40.

In accordance with the present disclosure, the embodiments relating to indexing of the housing 40 may be used as an alternative to, or in combination with, the embodiments relating to pick and place insertion of the battery cells 44 into the housing 40. In this regard, the present disclosure also provides a method 250, an embodiment of which is depicted in FIG. 16, for manufacturing lithium ion battery modules in accordance with the indexing approach described above. To help illustrate aspects of the method 250, the method 250 will be described in combination with the illustration of FIG. 17, which depicts various steps in the indexing process.

As illustrated in FIG. 16, the method 250 may include indexing (block 252) the housing 40, for example to determine a space, distance, or another appropriate measurement for a location in the housing 40 corresponding to where battery cells 44 are to be inserted. Indexing in accordance with block 252 may include, for example, performing automated measurements (e.g., with the indexing system 242). In other embodiments, measurements may be provided to the indexing system 242 and/or the control system 202, and the indexing system 242 and/or the control system 202 may associate the entered measurements with appropriate features of the housing 40 (e.g., the distances 238, 240).

To prepare the housing 40 for battery cell 44 insertions, the method 250 also includes positioning (block 224) the battery module housing 40 to receive certain components, as described above with respect to FIG. 14. In certain embodiments, the indexing system may be involved in the positioning of the housing 40 (e.g., using the housing actuation system).

Once the housing 40 is appropriately positioned, a first of the battery cells 44 from a group (e.g., from the cell source 212 of FIG. 14) may be placed (block 254) into a battery cell position of the housing 40, for example at a particular cell insertion location of the robotic placement system 206. The corresponding location for the first battery cell may be referred to as a first position within the housing. The method 250 may also include, either separately or in combination with insertion of the first battery cell, an insertion of a spacer into the housing 40 in a corresponding location for the spacer (e.g., a first spacer position for a first spacer). For example, as shown in FIG. 17, the module housing 40 may have a first battery cell position 232A for a first battery cell 44A, a first spacer position 234A for a first spacer 236A, and so forth. The method 250, in accordance with block 254, may cause a placement system (e.g., robotic placement system 206 of FIG. 14) or a conveyance system 255 (e.g., including a conveyor belt or the like), or both, to direct the first battery cell 44A into the first battery cell position 232A of the housing 40. In certain embodiments, the first spacer 236A may also be directed into the first spacer position 234A, either at the same time or after placing the first battery cell 44A into the first battery cell position 232A, followed by an actuation along a fixed distance corresponding to a space size of the first battery cell position 232A and/or the first spacer position 234A.

In this regard, returning to FIG. 16, once the first battery cell (and any associated spacers) is positioned in the housing 40, the method 250 includes moving (block 256) the housing 40 by a fixed distance to position the housing 40 so that additional components (e.g., battery cells, spacers) can be inserted therein. For example, the distance that the housing 40 is moved may correspond to any one or a combination of the indexed distances determined in accordance with block 252. Again, the movement may be performed by, for example, a housing actuation system (e.g., one or more servomechanisms). Furthermore, it should be noted that more complex movements are also encompassed by the present disclosure. For example, block 256 may alternatively include moving the housing 40 along a fixed distance in combination with one or more rotations, followed by additional movements. In such embodiments, the movements, rotations, and displacements may all be according to indexed distances and spatial relationships. For example, as shown in transitioning from the top to bottom of FIG. 17, it can be seen that the housing 40 is moved (e.g., along direction 244 and/or along a rotational trajectory 257) to where a second battery position 232B is placed generally in-line with the conveyance system 255.

Returning to FIG. 16, once the housing 40 is appropriately positioned by movement along the fixed distance (or combinations of fixed movements), the method 250 includes placing (block 258) a second battery cell into the housing 40 (e.g., proximate the first battery cell). The placement may be performed in the same manner as set forth above for block 254, as shown in FIG. 17. In FIG. 17, it can be seen that the second battery cell 44B is placed into the second battery position 232B in the housing 40 corresponding to a specified location for the second battery cell 44B. Again, this may be performed alone, or in combination with spacer placement into the housing (e.g., placement of a second spacer into a second spacer position). Further, it should be noted that in automated systems, the robotic placement system 206 may perform highly precise and repeated movements, which can be more reliable than having multiple variables associated with component placement. Thus, in such embodiments, the robotic placement system 206 may place the second battery cell into the same position it positioned the first battery cell (i.e., it uses the same movement). However, because the housing 40 has been moved in accordance with block 256, the second battery cell is placed into an appropriate location within the housing 40.

As noted above, it is now recognized that certain types of cells that do not swell by an appreciable extent (e.g., less than 5% in any direction) may afford certain benefits with respect to clamping, retaining, and manufacturing in lithium ion battery modules. Indeed, the pick and place method of manufacturing and the indexing method of manufacturing may benefit from such battery cells, and it is now recognized that certain intermediates, such as partially assembled battery modules in accordance with present techniques, may be different compared to traditional intermediates. One example is depicted in FIG. 18, which is a front view of a partially assembled lithium ion battery module 270.

Specifically, the partially assembled lithium ion battery module 270 of FIG. 17 includes a plurality of the prismatic battery cells 44 disposed within the housing 40 in respective discontinuous slots 156. In other embodiments, the prismatic battery cells 44 may be disposed in continuous slots, or may simply be in a stacked arrangement with no retention or suspending features built into the housing 40. For example, the battery cells 44 may be stacked on top of one another, with one or more spacers positioned therebetween. In accordance with the present disclosure, the battery cells 44 may be substantially non-swellable, or may not exhibit an appreciable amount of swelling. That is, the prismatic battery cells 44 may swell by no more than 5%, no more than 4%, no more than 3%, no more than 2%, no more than 1%, or no more than 0.5% in any direction, and in particular in the thickness direction (i.e., along CT). In one embodiment, the prismatic battery cells 44 all include NMC as the cathode active material, and LTO as the anode active material. Thus, they are all NMC/LTO prismatic battery cells.

Unlike traditional intermediates, the battery cells 44 in FIG. 18 have different states of charge (SOC) that would otherwise preclude them from being incorporated into a partially assembled battery module. As an example, all components that will be positioned into the cell receptacle region 54, including any potential clamping features, any potential spacers, and any potential battery cells, are all present. In other words, the cell receptacle region 54 is fully filled. Unlike housings that include multiple pieces and are bolted together, or housings that have built-in cranking mechanisms, in accordance with one aspect of the present disclosure and as illustrated, the housing 40 is fully formed and is a one-piece structure, but does not include any built-in clamping features that place a clamping force on the battery cells 44, specifically on the active area 120 of the cells 44 (e.g., on their faces 76, 78). Indeed, the battery cells 44 are all in an uncompressed state, and may also be unrestrained in a floating arrangement.

More specifically, the states of charge of the prismatic battery cells 44 in FIG. 18 may all be relatively high, may all be relatively low, or may be a mixture of different states of charge that would otherwise cause traditional battery cells to swell and not be used in particular combinations for a variety of reasons. By way of example, the plurality of battery cells 44 may include a first prismatic NMC/LTO battery cell 44A, a second prismatic NMC/LTO battery cell 44B, a third prismatic NMC/LTO battery cell 44C, a fourth prismatic NMC/LTO battery cell 44D, a fifth prismatic NMC/LTO battery cell 44E, and a sixth prismatic NMC/LTO battery cell 44F, each having a respective cell thickness $CT_1$-$CT_6$, and each having a respective state of charge. In traditional configurations, if the state of charge of the cells 44 varied across the plurality by more than, for example, 30%, then $CT_1$-$CT_6$ would vary by a corresponding amount, for example an amount proportional to the state of charge due to swelling. However, in accordance with the present disclosure, $CT_1$-$CT_6$ may vary by no more than 5%, because the state of charge has little to no effect on their respective thicknesses. Indeed, the state of charge for the plurality of the battery cells 44A-44F may vary by between 25% and 60%, but $CT_1$-$CT_6$ do not vary by more than 5%, by more than 4%, by more than 3%, by more than 2%, by more than 1%, or by more than 0.5%. In other words, the NMC/LTO cells may have widely varying states of charge, but will not generally have varying cell thickness.

It should be appreciated that there may be a different number of such cells in other instantiations, such as in the other embodiments shown in FIG. 3. Further, it should be noted that the partially assembled battery module 270 may not include features that would otherwise serve to balance the state of charge of the plurality of battery cells. For example, the partially assembled battery module 270 may not include electrical components electrically connecting the battery cells 44 to one another, or a battery control module or similar regulation and control circuitry that would otherwise serve to balance charge across the plurality of the battery cells 44.

One or more of the disclosed embodiments, alone or on combination, may provide one or more technical effects including the use of substantially non-swelling battery cells in an unclamped, uncompressed arrangement. The use of such arrangements may result in battery modules that do not require the use of clamping mechanisms, battery cell hold down mechanisms, and the like, and accordingly have reduced weight and associated cost. Further, the use of such types of battery cells facilitates manufacturing and reduces associated costs by enabling faster manufacture and greater compatibility between battery modules by enabling a particular set of battery cells to have generally the same size with little to no variation due to manufacturing. The technical effects and technical problems in the specification are exemplary and are not limiting. It should be noted that the embodiments described in the specification may have other technical effects and can solve other technical problems.

While only certain features and embodiments have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the disclosed subject matter. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A lithium ion battery module system, comprising:
   a battery module housing;
   a plurality of prismatic battery cells positioned within the battery module housing in a floating arrangement, wherein each prismatic battery cell of the plurality of prismatic battery cells comprises cell terminals positioned at a first casing portion, a second casing portion positioned opposite the first casing portion, first and second sides extending between the first and second casing portions, and first and second faces connecting the first and second sides, the first and second faces being opposite one another, wherein a thickness of each prismatic battery cell is defined by a distance between the first and second faces, wherein the floating arrangement includes respective gaps between first and second faces of adjacent cells of the plurality of prismatic battery cells; and
   wherein each prismatic battery cell of the plurality of prismatic battery cells is substantially non-swellable and comprises a respective state of charge, and wherein the respective states of charge vary by at least 20% and the respective thicknesses vary by no more than 5% across the plurality of prismatic battery cells.

2. The lithium ion battery module system of claim 1, wherein the battery module housing and the plurality of prismatic battery cells are a part of a partially assembled lithium ion battery module.

3. The lithium ion battery module system of claim 2, wherein the plurality of prismatic battery cells comprise lithium titanate (LTO) as an anode active material.

4. The lithium ion battery module system of claim 3, wherein the plurality of prismatic battery cells comprise $LiNi_{1/3}Mn_{1/3}Co_{1/3}O_2$ (NMC) as a cathode active material.

5. The lithium ion battery module of claim 4, wherein the plurality of prismatic battery cells comprise $LiCoO_2$ (LCO) as a cathode active material.

6. The lithium ion battery module system of claim 2, wherein the plurality of prismatic battery cells are not electrically connected.

7. The lithium ion battery module system of claim 2, wherein the partially assembled lithium ion battery module does not comprise control and regulation circuitry to balance the charge of the plurality of prismatic battery cells.

8. The lithium ion battery module system of claim 1, wherein each prismatic battery cell of the plurality of prismatic battery cells is substantially non-swellable in that each prismatic battery cell swells by no more than 5% in any direction, and wherein each prismatic battery cell of the plurality of prismatic battery cells has a respective cell thickness within 5% of a standardized thickness.

9. The lithium ion battery module system of claim 1, wherein the floating arrangement includes an arrangement having each battery cell of the plurality of prismatic battery cells being suspended within the battery module housing.

10. The lithium ion battery module system of claim 1, wherein the respective thicknesses varying by no more than 5% across the plurality of prismatic battery cells enables the respective gaps between the first and second faces of adjacent cells of the plurality of prismatic battery cells.

11. The lithium ion battery module system of claim 1, wherein the floating arrangement includes the plurality of prismatic battery cells being unclamped to one another.

12. The lithium ion battery module system of claim 1, wherein the floating arrangement includes the plurality of prismatic battery cells being in an uncompressed state.

13. The lithium ion battery module system of claim 1, wherein the floating arrangement includes no opposing normal forces placed on the first and second faces of adjacent cells of the plurality of prismatic battery cells, resulting in active areas of the plurality of prismatic battery cells remaining in a substantially uncompressed state.

14. The lithium ion battery module system of claim 1, wherein each gap of the respective gaps include an air gap.

15. The lithium ion battery module system of claim 1, wherein each gap of the respective gaps include a layer.

16. The lithium ion battery module system of claim 15, wherein the layer is selected from the group consisting of a structural support layer, a padding layer, a thermal interface layer, a spacer, and an electrical isolation layer.

* * * * *

UNITED STATES PATENT AND TRADEMARK OFFICE
CERTIFICATE OF CORRECTION

PATENT NO.         : 10,862,159 B2
APPLICATION NO.    : 16/030969
DATED              : December 8, 2020
INVENTOR(S)        : DeKeuster et al.

It is certified that error appears in the above-identified patent and that said Letters Patent is hereby corrected as shown below:

In the Specification

In Column 1, Line 9, delete "2015," and insert -- 2015, now Pat. No. 10,020,534 --, therefor.

In Column 1, Line 47, delete "full hybrid systems" and insert -- full hybrid electric vehicles --, therefor.

In Column 1, Line 50, delete "mild hybrid systems" and insert -- mild hybrid electric vehicles --, therefor.

In Column 6, Line 26, delete "battery monitoring system" and insert -- battery management system --, therefor.

In Column 11, Line 52, delete "bottom and top casing portions 62, 70" and insert -- bottom and top casing portions 70, 62 --, therefor.

In Column 11, Line 62, delete "base 42" and insert -- base 46 --, therefor.

In Column 12, Line 49, delete "(DIN codes)," and insert -- (DIN) codes, --, therefor.

In Column 15, Line 54, delete "columns Using" and insert -- columns. Using --, therefor.

In Column 19, Line 8, delete "lengths (CL)." and insert -- cell lengths (CL). --, therefor.

In Column 24, Line 10, delete "indexing system 242)." and insert -- indexing system 230). --, therefor.

In Column 24, Line 12, delete "indexing system 242" and insert -- indexing system 230 --, therefor.

In Column 24, Line 13, delete "indexing system 242" and insert -- indexing system 230 --, therefor.

Signed and Sealed this
Twenty-third Day of March, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 10,862,159 B2

In the Claims

In Column 28, Line 4, in Claim 5, delete "module" and insert -- module system --, therefor.